United States Patent
Yi et al.

(10) Patent No.: US 11,714,861 B2
(45) Date of Patent: *Aug. 1, 2023

(54) QUERY SELECTION METHOD AND SYSTEM

(71) Applicant: HITHINK ROYALFLUSH INFORMATION NETWORK CO., LTD., Zhejiang (CN)

(72) Inventors: Zheng Yi, Hangzhou (CN); Wei Xia, Hangzhou (CN); Zhiwei Tao, Hangzhou (CN)

(73) Assignee: HITHINK ROYALFLUSH INFORMATION NETWORK CO., LTD., Hangzhou (CN)

( * ) Notice: Subject to any disclaimer, the term of this patent is extended or adjusted under 35 U.S.C. 154(b) by 241 days.

This patent is subject to a terminal disclaimer.

(21) Appl. No.: 17/134,566

(22) Filed: Dec. 28, 2020

(65) Prior Publication Data

US 2021/0117493 A1    Apr. 22, 2021

Related U.S. Application Data

(63) Continuation of application No. 16/252,819, filed on Jan. 21, 2019, now Pat. No. 10,922,371, which is a (Continued)

(30) Foreign Application Priority Data

Apr. 28, 2013 (CN) .......................... 201310155688.6

(51) Int. Cl.
*G06F 16/00* (2019.01)
*G06F 16/9535* (2019.01)
(Continued)

(52) U.S. Cl.
CPC ...... *G06F 16/9535* (2019.01); *G06F 16/2246* (2019.01); *G06F 16/24578* (2019.01); *G06F 16/3329* (2019.01)

(58) Field of Classification Search
CPC ........... G06F 16/2246; G06F 16/24578; G06F 16/3329; G06F 16/9535
See application file for complete search history.

(56) References Cited

U.S. PATENT DOCUMENTS 6,594,783 B1    7/2003    Dollin et al.
8,301,438 B2    10/2012   Ferrucci et al.
(Continued)

FOREIGN PATENT DOCUMENTS

CN    1691013 A    11/2005
CN    101079051 A   11/2007
(Continued)

OTHER PUBLICATIONS

Liu et al., "Query Understanding Enhanced By Hierarchical Parsing Structures," IEEE 2013, pp. 72-77. (Year: 2013).*
(Continued)

*Primary Examiner* — Cheryl Lewis
(74) *Attorney, Agent, or Firm* — Metis IP LLC

(57) ABSTRACT

A system and method for query selection are provided. The method may include acquiring a natural language sentence, pre-processing to obtain a standard node sequence, constructing a node tree based on the relationship between an index node and other nodes, generating a data query command based on the node tree, querying data using the data query command, and filtering the results. The standard node sequence may include at least an index node and a condition node. The node tree may be used to characterize the index-condition combination. The system may include an acqui-
(Continued)

sition unit, a pre-processing unit, a node tree construction unit, a translation unit, and a querying and filtering unit.

20 Claims, 18 Drawing Sheets

Related U.S. Application Data continuation-in-part of application No. 14/787,472, filed as application No. PCT/CN2014/080619 on Jun. 24, 2014, now Pat. No. 10,185,772.

(51) Int. Cl.
    *G06F 16/22*     (2019.01)
    *G06F 16/2457*     (2019.01)
    *G06F 16/332*     (2019.01)

(56) References Cited

U.S. PATENT DOCUMENTS

| | | |
|---|---|---|
| 10,460,726 B2 | 10/2019 | Lee |
| 2009/0112835 A1 | 4/2009 | Elder |
| 2010/0257512 A1 | 10/2010 | Ortscheid |
| 2011/0078554 A1 | 3/2011 | Nie et al. |
| 2012/0136649 A1 | 5/2012 | Freising et al. |
| 2013/0080472 A1 | 3/2013 | Cohen et al. |
| 2020/0226190 A9 | 7/2020 | Yi et al. |

FOREIGN PATENT DOCUMENTS

| | | |
|---|---|---|
| CN | 101510221 A | 8/2009 |
| CN | 101930428 A | 12/2010 |
| CN | 102262634 A | 11/2011 |
| CN | 102779163 A | 11/2012 |
| TW | 432298 B | 5/2001 |

OTHER PUBLICATIONS

Xu et al., "Exploiting Shared Information for Multi-Intent Natural Language Sentence Classification," Iterspeech, 2013, pp. 3785-3789. (Year: 2013).*
International Search Report in PCT/CN2014/080619 dated Sep. 24, 2014, 7 pages.
Written Opinion in PCT/CN2014/080619 dated Sep. 24, 2014, 13 pages.
First Office Action in Chinese Application No. 201310155688.6 dated Aug. 7, 2015, 16 pages.

* cited by examiner

| No. | NAME (default index) | MATH RANKING (first index) |
|---|---|---|
| 1 | Student A | 1 |
| 2 | Student B | 2 |
| 3 | Student C | 3 |
| 4 | Student D | 4 |

FIG. 17

| No. | NAME (default index) | MATH RANKING (first index) | MATH SCORE (second index) |
|---|---|---|---|
| 1 | Student A | 1 | 100 |
| 2 | Student B | 2 | 98 |
| 3 | Student C | 3 | 96 |
| 4 | Student D | 4 | 90 |

FIG. 18

| No. | NAME (default index) | MATH RANKING (first index) | MATH SCORE (second index) | Total RANKING (third index) |
|---|---|---|---|---|
| 1 | Student A | 1 | 100 | 15 |
| 2 | Student B | 2 | 98 | 3 |
| 3 | Student C | 3 | 96 | 1 |
| 4 | Student D | 4 | 90 | 5 |

FIG. 19

QUERY SELECTION METHOD AND SYSTEM

CROSS REFERENCE TO RELATED APPLICATIONS

This application is a Continuation of U.S. patent application Ser. No. 16/252,819 filed on Jan. 21, 2019, which is a Continuation in part of U.S. patent application Ser. No. 14/787,472 filed on Oct. 28, 2015 now U.S. patent Ser. No. 10/185,772, which is a National Stage Entry of International Application No. PCT/CN2014/080619 filed on Jun. 24, 2014, which claims priority of Chinese Application No. 201310155688.6 filed on Apr. 28, 2013, the entire contents of each of which are hereby incorporated by reference.

TECHNICAL FIELD

The present invention relates generally to process technology and, more specifically, to a method and system for query selection.

BACKGROUND

When querying data from a database or other sources of data, a user is typically provided with several query options (or referred to as query indexes or indexes) by systems currently in existence, and after a user chooses a certain index, the systems currently in existence collocate restrictions according to the index, combine all the restrictions based on a logic relationship of "and" or "or," generate query instructions, query and filter data from the database, and display the filtered result to the user. In such systems, the user may be unable to query and filter data by providing a natural language sentence.

SUMMARY

Accordingly, in one embodiment of the present invention, a query selection method and system is provided in order to solve the above-identified problem.

To achieve the objective mentioned above, one embodiment of the present invention provides the following technical solutions:

A query selection method, at least based on a query selection system, including:

the query selection system obtaining a natural language sentence provided by a user;

the query selection system pre-processing the natural language sentence provided by the user, obtaining a standard node sequence, wherein the node may include at least an index node and a condition node, wherein the condition node may include at least one of a number node, a date node, or a character string node;

the query selection system constructing a node tree according to a relationship between the index node and other nodes, wherein the node tree may represent a combination of an index node and a condition node;

the query selection system generating a data query command according to the node tree;

the query selection system querying data based on the data query command, filtering query results, and obtaining a filtered result; and the query selection system displaying the filtered results.

A query selection system, including:

an acquisition unit configured to acquire a natural language sentence provided by a user;

a pre-processing unit configured to pre-process the natural language sentence provided by the user, and obtain a standard node sequence, wherein the node may include at least an index node and a condition node, wherein the condition node may further include at least one of a number node, a date node, or a character string node;

a node tree construction unit configured to construct a node tree according to a relationship between the index node and other nodes, wherein the node tree may be configured to represent an index-condition combination;

a translation unit configured to translate the node tree into a data query command;

a querying and filtering unit configured to query data based on the data query command, and filter query results to obtain a filtered result; and a display unit configured to display the filtered result.

According to some other embodiments of the present disclosure, a query selection method specifically for querying data from one or more databases is provided. The method may include obtaining a natural sentence and generating a standard node sequence based on the natural sequence. The standard node sequence may include multiple index nodes and at least one condition node. The multiple index nodes may correspond to indexes of the one or more database. The at least one condition node may include at least one of a number node, a date node, or a character string node. The method may also include constructing a node tree according to the standard node sequence. The node tree may be structured to include the multiple index nodes, the at least one condition node, a first relationship between a first index node of the multiple index nodes and a second index node of the multiple index nodes, and a second relationship between at least one index node of the multiple index nodes and the at least one condition node. The method may further include generating a data query command according to the node tree, querying data using the data query command from the one or more databases to obtain a query result, and filtering the query result based on the node tree to obtain a filtered result.

In some embodiments, the obtaining a natural sentence may include: receiving audio information inputted by a user via a voice input device; and performing a speech recognition on the audio information to obtain the natural sentence.

In some embodiments, the obtaining a natural sentence may further include: determining a user status indicator by detecting, via an electric sensor, a user status of the user when the user is inputting the audio information. The user status may relate to at least one of an activity, a physical or mental state, an environment, or a location of the user when the user is inputting the audio information. The speech recognition may be performed based on the user status indicator.

In some embodiments, the speech recognition may be performed based on historical activity information of the user.

In some embodiments, the generating a standard node sequence based on the natural sequence may include: obtaining multiple words or phrases by performing word segmentation on the natural sentence; obtaining a raw node sequence corresponding to the natural sentence, wherein the raw node sequence may include at least one node, each node of the at least one node in the raw node sequence including a word or a phrase of the multiple words or phrases; determining that the raw node sequence is non-standard by examining index key words or matching characteristics of specific phrasing; and converting the non-standard raw node sequence to the standard node sequence.

In some embodiments, the converting the non-standard raw node sequence to the standard node sequence may be based on a machine learning algorithm.

In some embodiments, the method may further include identifying a category of the user based on the identity information of the user, wherein the machine learning algorithm further takes the category of the user as a part of its input.

In some embodiments, the converting the non-standard raw node sequence to the standard node sequence is according to a conversion rule set.

In some embodiments, the method may further include: determining a category of the user based on identity information of the user; and selecting, in response to the category of the user, an identity related rule from the conversion rule set. The non-standard raw node sequence may be converted to the standard node sequence based at least in part on the identity related rule.

In some embodiments, the method may further include displaying the filtered result via an interface by: identifying a first index corresponding to an index node of the standard node sequence; and displaying, via the interface, first data of items of the filtered result corresponding to the first index.

In some embodiments, the displaying the filtered result further may include: selecting, from the indexes of the one or more databases, one or more second indexes based on correlation indicators of the indexes of the one or more databases with respect to the first index, wherein each of the correlation indicators indicates a correlation between a corresponding index of the indexes of the one or more databases and the first index; and displaying, via the interface, second data of items of the filtered result corresponding to the one or more second indexes, wherein the standard node sequence includes no node corresponding to the one or more second indexes.

In some embodiments, the method may further include: further displaying, via the interface, third data of items of the filtered result corresponding to a third index in response to an operation of a user; and updating the correlation indicator of the third index.

In some embodiments, the method may further include: further displaying, via an interface, fourth data of items of the filtered result corresponding to a fourth index in response to an operation of a user.

In some embodiments, the fourth index may not be included in the indexes of the one or more databases, and the method may also include: retrieving a computing mean for computing data of the fourth index based at least in part on data of a fifth index included in the indexes of the one or more databases; and computing the fourth data based at least in part on fifth data of items of the filtered result corresponding to the fifth index using the computing mean.

In some embodiments, the method may further include updating the standard node sequence by: identifying a first update node included in an original version of the standard node sequence, the first update node indicating an update of the standard node sequence to be performed; identifying an index/condition node to be updated in the original version of the standard node according to nodes within a first distance from the first update node; identifying a second update node within a second distance from the first update node, the second update node indicating how to update the index/condition node to be updated; updating the index/condition node to be updated according to the second update node; and removing at least the first update node and the second update node from the original version of the standard node.

In some embodiments, the method may further include: obtaining a third natural sentence; generating a second standard node sequence based at least in part on the third natural sentence; constructing a second node tree based on the second standard node sequence; and filtering the filtered result based on the second node tree to obtain a second filtered result.

In some embodiments, the generating a second standard node sequence may include: constructing a preliminary standard node sequence based on the third natural sentence; identifying one or more missing nodes of the preliminary standard node sequence; identifying target nodes of the first standard node sequence corresponding to the one or more missing nodes of the second standard node sequence; and generating the second standard node sequence based on the target nodes of the first standard node sequence and the preliminary standard node sequence.

In some embodiments, the method may further include: obtaining a fourth natural sentence; generating a fourth standard node sequence based on the fourth natural sentence, the fourth standard node tree including an operation node and one or more object nodes, the operation node corresponding to a desired operation, and the one or more object nodes indicating one or more items of the filtered result; generating an operation command according to the operation node and the one or more object nodes; and causing, according to the operation command, the desired operation to be performed on the one or more items of the first filtered result.

According to some other embodiments of the present disclosure, a query selection system specifically configured to query data from one or more databases is provided. The system may include a storage device storing a set of instructions, and at least one processor. When executing the instructions, the at least one processor may cause the system to obtain a natural sentence and generate a standard node sequence based on the natural sequence. The standard node sequence may include multiple index nodes and at least one condition node. The multiple index nodes may correspond to indexes of the one or more database. The at least one condition node may include at least one of a number node, a date node, or a character string node. The system may also be caused to construct a node tree according to the standard node sequence. The node tree may be structured to include the multiple index nodes, the at least one condition node, a first relationship between a first index node of the multiple index nodes and a second index node of the multiple index nodes, and a second relationship between at least one index node of the multiple index nodes and the at least one condition node. The system may further be caused to generate a data query command according to the node tree, query data using the data query command from the one or more databases to obtain a query result, and filter the query result based on the node tree to obtain a filtered result.

According to some other embodiments of the present disclosure, a non-transitory computer readable medium storing instructions compatible for querying data from one or more databases is provided. When executed by a processor, the instructions may cause the processor to execute operations. The operations may include obtaining a natural sentence and generating a standard node sequence based on the natural sequence. The standard node sequence may include multiple index nodes and at least one condition node. The multiple index nodes may correspond to indexes of the one or more database. The at least one condition node may include at least one of a number node, a date node, or a character string node. The operations may also include constructing a node tree according to the standard node sequence. The node tree may be structured to include the multiple index nodes, the at least one condition node, a first relationship between a first index node of the multiple index nodes and a second index node of the multiple index nodes, and a second relationship between at least one index node of the multiple index nodes and the at least one condition node. The operations may further include generating a data query command according to the node tree, querying data using the data query command from the one or more databases to obtain a query result; and filtering the query result based on the node tree to obtain a filtered result.

According to the technical solutions described above, in one embodiment of the present invention, after a user provides a natural language sentence, the query selection system may process the natural language sentence automatically, construct a node tree representing an index-condition combination, generate a data query command according to the node tree, query results in the database, filter the results and display the filtered result to the user, and thus implementing querying and filtering data by providing a natural language sentence. Besides, the user may provide a natural language sentence without choosing indexes or collocating restrictions, and therefore the operations of the user may be simplified and the user operation time may be reduced.

BRIEF DESCRIPTION OF THE DRAWINGS

In order to illustrate the technical solutions in connection with the embodiments of the present invention or prior art more explicitly, drawings that may be used in the description of the embodiments or prior art are simply illustrated below. Obviously, drawings described below are only some embodiments of the present invention. A person with ordinary skill in the art, and without further inventive work, may apply other drawings to the provided drawings.

FIG. 17 is a schematic view of the displayed first data according to some embodiments of the present invention;

FIG. 18 is a schematic view of the concurrently displayed first data and second data according to some embodiments of the present invention;

FIG. 19 is a schematic view of the concurrently displayed first data, second data, and third data according to some embodiments of the present invention.

DETAILED DESCRIPTION

The technical solutions of the embodiments of the present invention will be described clearly and completely in connection with the accompanying drawings. Obviously, the embodiments described herein are only part of some embodiments of the present invention and not all of them. All other embodiments obtained by a person with ordinary skill in the art based on the embodiments of the present invention without further inventive work are within the scope of protection of the present invention.

When querying data from a database or a data source, a user is typically provided with several query options (or referred to as query indexes or indexes) by systems currently in existence, and after the user chooses a certain index, collocates restrictions according to the index, and combines all the restrictions based on logic relationship of "and" or "or", the system currently in existence may generate query instructions, query and filter data from the database, and display to the user.

For example, if a user wants to search for students whose math scores and Chinese scores are both above 80, the user may need to choose at least two indexes of "math score" and "Chinese score", set two restrictions of" >80, and combine the two restrictions based on an "and" logical relationship. The system may then generate a query command, query and filter data from the database or data sources, and display.

Therefore, the user may be unable to query and filter data by providing a natural language sentence using existing technologies found in the prior art.

Accordingly, embodiments of the present invention provide a query selection process and system in order to solve the above problems.

Figure 1:
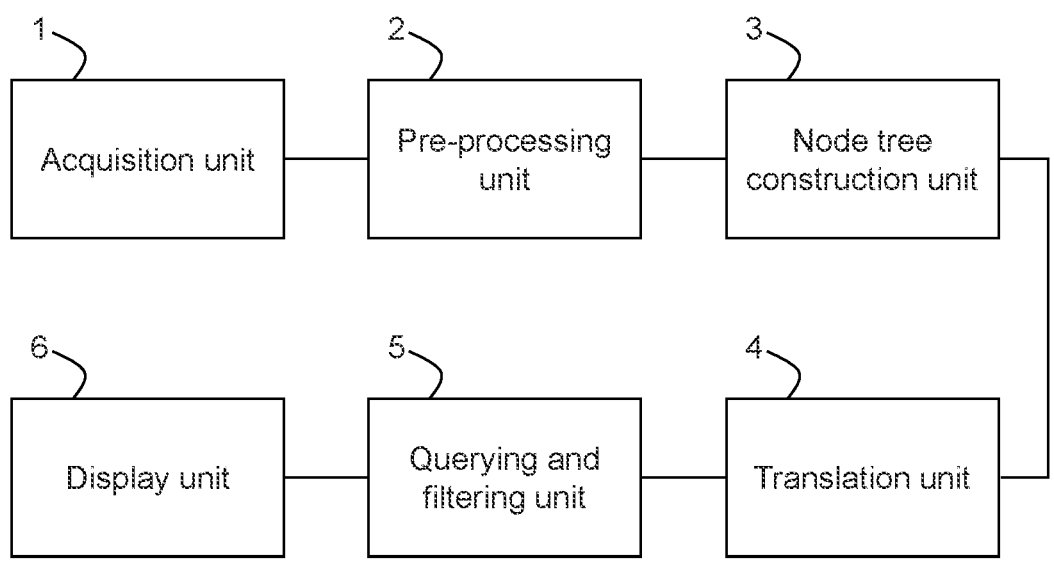
FIG. 1 is a schematic view of the structure of the query selection system according to some embodiments of the present invention.

Referring to FIG. 1, the query selection system mentioned above may include at least an acquisition unit 1, a pre-processing unit 2, a node tree construction unit 3, a translation unit 4, a querying and filtering unit 5, and a display unit 6.

Figure 2:
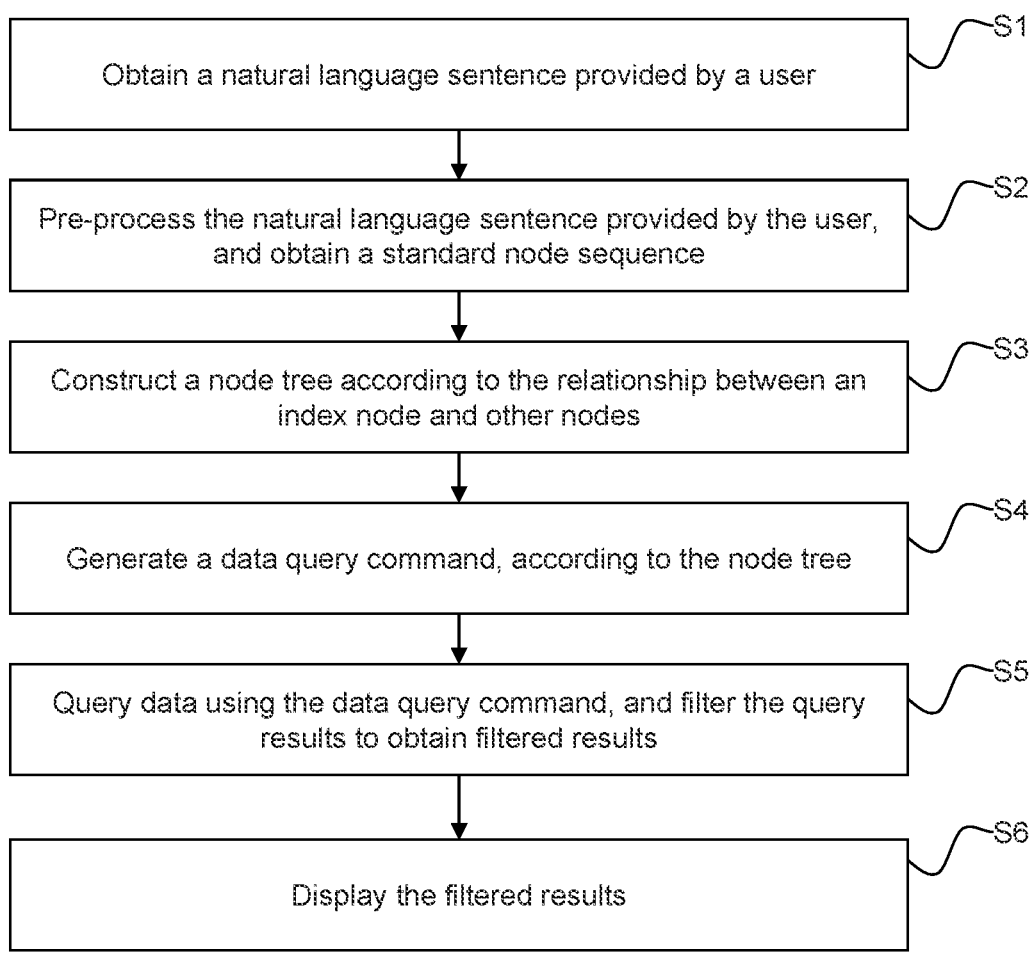
FIG. 2 is a flowchart of a process for the query selection according to some embodiments of the present invention.

Based on the query selection system mentioned above, referring to FIG. 2, a process for query selection according to some embodiments of the present invention includes at least the following steps:

S1, the query selection system (the acquisition unit) acquiring a natural language sentence provided by a user;

A user may provide the natural language sentence by a handwriting input, a keyboard input, or a voice input. Therefore, the acquisition unit mentioned above may include a keyboard, a microphone (for voice input), a stylus, and a touch-screen (the stylus and the touch-screen may be configured for handwriting input), etc.

S2, the query selection system (the pre-processing unit) pre-processing the natural language sentence provided by the user and obtaining a standard node sequence (considering there are other standard node sequences mentioned later, the standard node sequence obtained in step S2 may be referred to as a first standard node sequence).

The nodes mentioned above may include at least an index node and a condition node, and the condition node may include at least one of the following: a number node, a date node, or a character string node.

S3, the query selection system (the node tree construction unit) constructing a node tree based on the relationship between the index node and other nodes, wherein the node tree may be configured to represent an index-condition combination;

S4, the query selection system (the translation unit) generating a data query command according to the node tree;

S5, the query selection system (the querying and filtering unit) querying data based on the data query command, and filtering the query result to obtain a filtered result;

S6, the query selection system (display unit) displaying the filtered results. Specifically, the display unit may be a display screen.

According to the technical solutions described above, in some embodiments of the present invention, after a user provides a natural language sentence, the query selection system may automatically process the natural language sentence, construct a node tree representing an index-condition combination, generate a data query command according to the node tree, query and filter data from the database, and display a result to the user, thereby querying and filtering data based on a natural language sentence provided by the user. Besides, the user may provide a natural language sentence without choosing an index or collocating a restriction, resulting in a simplification for user operations and hence, a reduction of user operation time.

Steps S2 to S4 are illustrated in greater detail below.

Figure 3:
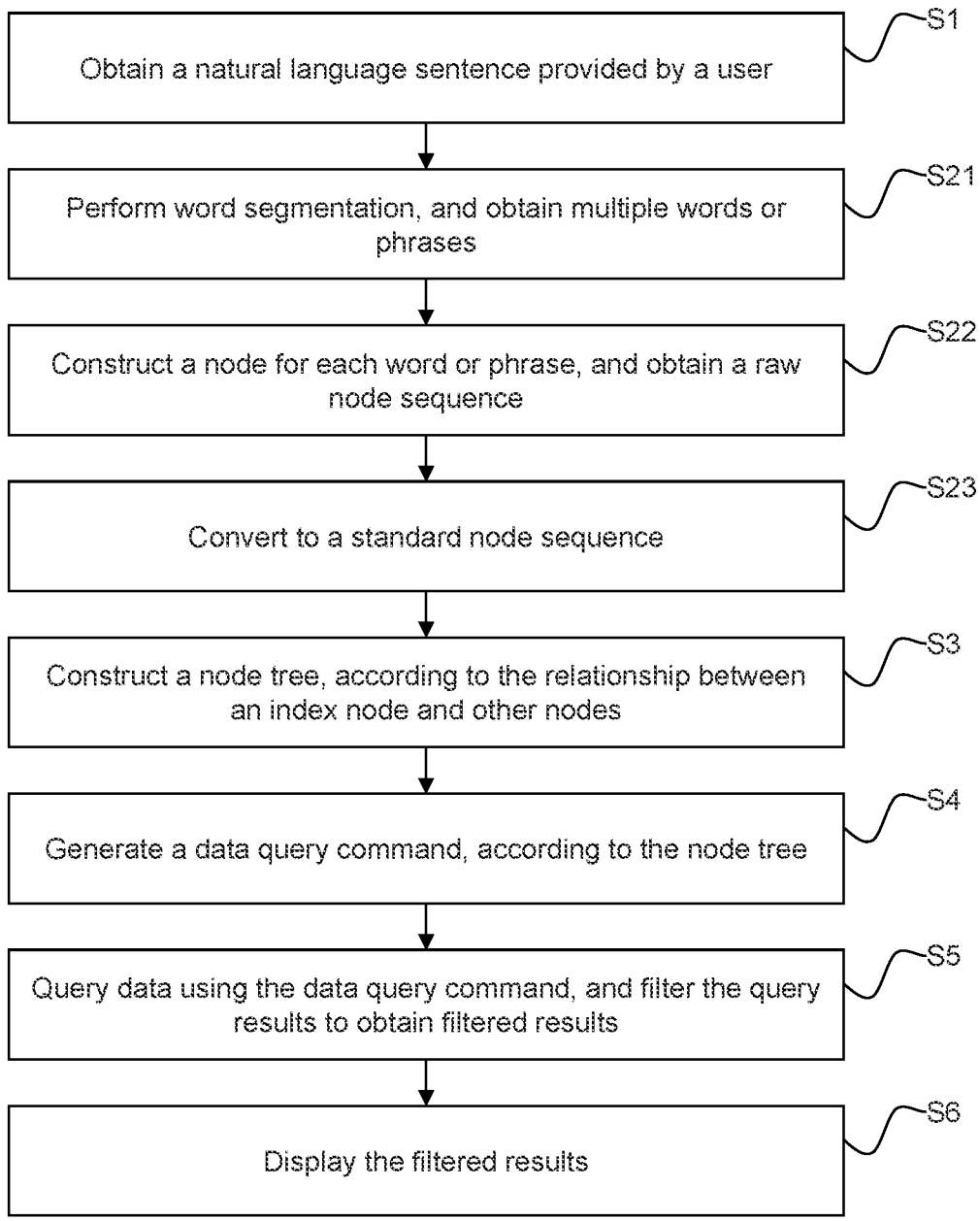
FIG. 3 is a flowchart of a process for the query selection according to some embodiments of the present invention.

First, the S2 step is illustrated. Referring to FIG. 3, in some embodiments of the present invention, the S2 step may include:

S21, performing word segmentation with respect to a natural language sentence provided by the user and obtaining multiple words or phrases;

S22, constructing a node for each word or phrase, and obtaining raw node sequences corresponding to the natural language sentence provided by user;

The raw node sequence may include at least one node.

More specifically, nodes corresponding to each word or phrase may be constructed by utilizing a configuration dictionary; the types of nodes may include a question word node, an index node, a number node, a date node, a logic word node, a character string node, etc., and a semantic node sequence corresponding to the sentence provided by the user may be obtained.

Either the number node or the character string node may be a restriction for an index node. For example, in "the math score of Ming Li in room five, the 3rd grade," "Ming Li" may be a character string node, which may be a restriction of the index node "name"; while in "math score above 90," "above 90" may be a number node as a restriction for the index node "math score."

When the number node and the date node are configured, it may first be recognized that a phrase includes a number, it may then be determined whether this number is a date; if so, the number may be constructed as a date node; otherwise it may be constructed as a number node.

It shall be noted that the query options (namely query indexes) a particular system (namely under certain scenarios) may provide may be fixed. For example, in a student grade query system, the indexes it may provide including grade, class, subjects (such as math, Chinese, geography, history, biology, and so on), etc., may be fixed. Therefore, the index key words may be used to match the words and phrases obtained from word segmentation, and thus to identify indexes included in the sentence provided by the user.

For example, using index key words such as math, Chinese, geography, history, biology, etc., from "subjects" index, to match the sentence "the students in room five, the 3rd grade whose math score is over 90 points and Chinese score is over 80 points, the system may determine that the sentence includes two indexes "math" and "Chinese."

Similarly, the logic words may be fixed; a logic word dictionary may be pre-determined, which may include key logic words such as "as well as," "and," "moreover," "meanwhile," "with," "or," etc., and then the logic key words may be used to match the words and phrases obtained from word segmentation, and thus the system may determine whether there are logic relationship nodes.

S23, converting the raw node sequence to a standard node sequence (which may be processed by the following node tree construction unit);

Because a user may provide an arbitrary natural language sentence, the corresponding node sequence may be unstandardized. In the previous example, "the math score of Ming Li in room five there is the phrase "Ming Li" without the word "name, where the corresponding node sequence may include a character String node "Ming Li," and may lack a corresponding index node "name." Therefore, the index node "name" may need to be appended in order for a standard node sequence to be generated as in "the math score of name Ming Li in room five, the 3rd grade."

More specifically, the node sequences corresponding to a natural language sentence provided by a user may be converted to a standard node sequence that may be processed by the node tree construction unit according to the configuration rules:

First, whether the phrasing of the raw node sequence is standard is determined by examining key words and matching the characteristics of specific phrasing, the detected non-standard phrasings are converted to semantic node sequences corresponding to standard phrasings according to the conversion rules set by the configuration files. The key words may be expressed using regular expression.

For example, if a user inputs "it rains for 3 consecutive days", the regular expression "for * consecutive days" may be used to match and convert phrasing, converting "it rains for 3 consecutive days" to standard phrasings "it rains today, it rained yesterday and it rained the day before yesterday."

Meanwhile, "rain" is a character string node of the condition nodes, it may correspond to the index node "weather, therefore, the index node "weather" needs to be appended. Finally, the standard phrasing is converted as "the weather today is rain, the weather yesterday was rain and the weather the day before yesterday was rain."

It should be noted that if the user uses voice input to provide a sentence, the above step S2 may also include a step of speech recognition to convert voice input into text and to obtain a text result, thus converting voice into text.

After obtaining a standard node sequence, the following step S3 may include constructing a node tree according to the relationship between the index node and other nodes.

In some embodiments, the converting the non-standard raw node sequence to the standard node sequence may be based on a machine learning algorithm. The model for implementing the machine learning algorithm may take the raw node sequence as at least part of its input, and generate the standard node sequence as its output. The machine learning algorithm may be based on decision tree, support vector machine (SVM), neural network (e.g., Convolutional Neural Network (CNN), Recurrent Neural Network (RNN), residential network (ResNet), sequence to sequence (Seq2Seq) network), Bayesian network, genetic algorithm, or the like, or a combination thereof. The model used to implement the machine learning algorithm may be trained using a training dataset. For example, the training dataset may include a plurality of raw node sequences as inputs (or be referred to as training inputs) of the model and corresponding standard node sequences as supervisory outputs. The raw node sequences may be inputted into the model to generate a predicted output. Based on the difference between the predicted output and the corresponding supervisory output, parameters of the model may be adjusted using a training algorithm (e.g., an algorithm based on backpropagation) to reduce such a difference. After the training is completed (e.g., a convergence is met), the model may be adopted by the pre-processing unit 2 for converting raw node sequences into standard node sequences.

In some embodiments, the whole operation S2 may be performed based on a model of a machine learning algorithm. The model may take the natural language sentence as at least part of its input, and generate a corresponding standard node sequence as its output. For example, the training dataset for training such a model may include a plurality of natural language sentence as training inputs of the model and corresponding standard node sequences as supervisory outputs. After the training is completed, the model may be adopted by the pre-processing unit 2 for converting natural language sentences into standard node sequences.

Figure 4:
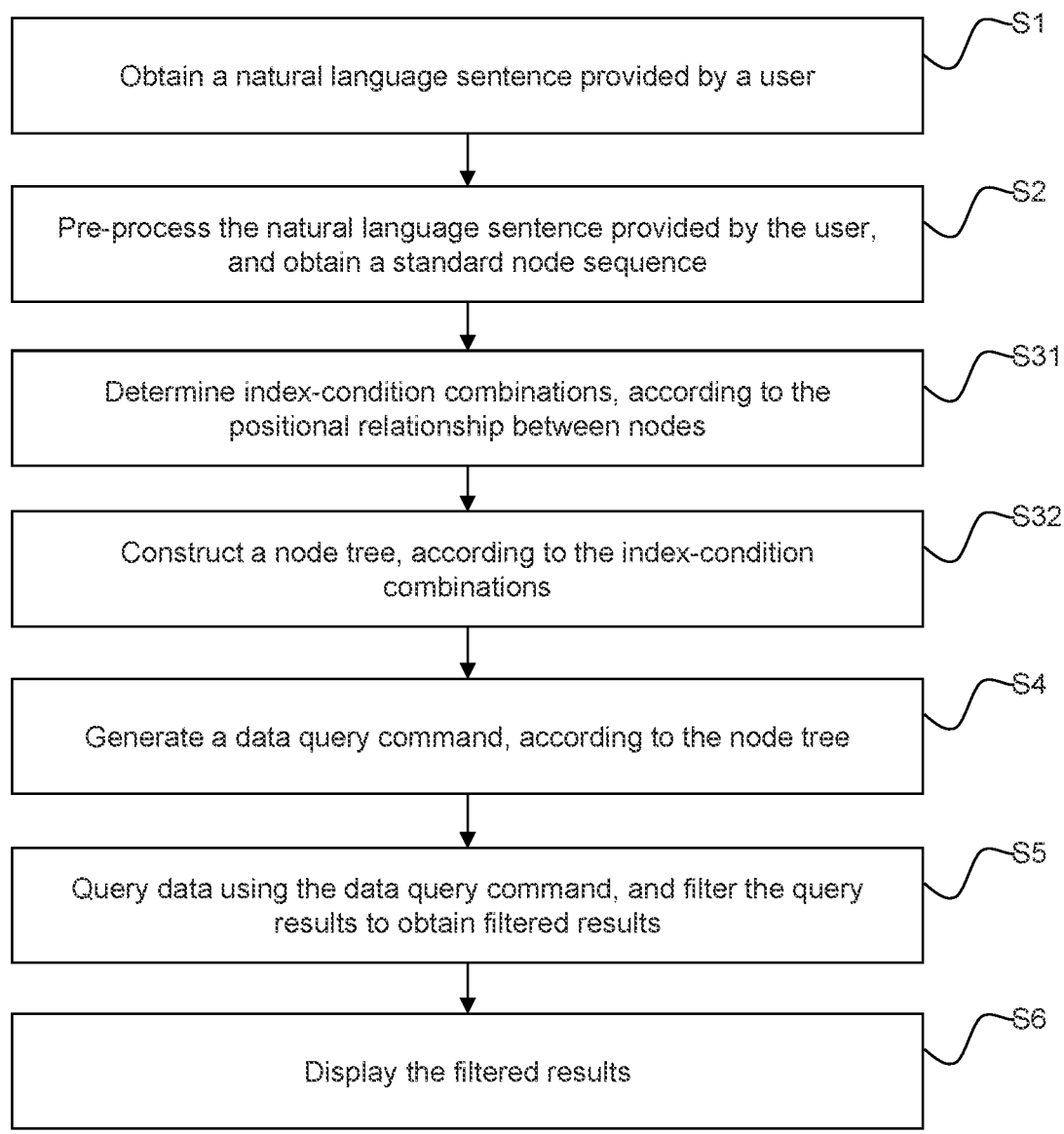
FIG. 4 is a flowchart of a process of the query selection according to Some embodiments of the present invention.

According to FIG. 4, Step S3 may further include the following:

S31, determining index-condition combinations, according to the positional relationship between nodes.

For example, in "the students in class five, the 3rd grade whose math score is over 90 points and Chinese score is over 80 points," "math grade" is an index node, "over 90 points" is a number node (condition node), and with respect to the positional relationship, "math grade" and "over 90 points" are next to each other. Given the positional relationship of the two, it may be determined that "over 90 points" is a restriction of the index node "math grade," that is, "over 90 points" is a condition node of the index node "math grade."

It should be noted that, "over 90 points" is not a precise value range comprehensible by a computer. Therefore, the number node "over 90 points" needs to be processed, and converted to a number node ">90", On the other hand, if a number node already includes a precise value range, for example, a user provides a sentence "room five, the 3rd grade, with a math grade >90," the number node may not need to be processed.

More specifically, when being processed, words or phrases such as "over," "larger and "higher may be converted into an symbolic expression such as ">"; similarly, words or phrases such as "below," "smaller," and "lower" may be converted into "<"; words or phrases such as "no larger than," "smaller than or equal to," "no more than," and "no higher than" may be converted into "≤"; words or phrases such as "no smaller than," "larger than or equal to," "no less than," and "no lower than" may be converted into "≥."

Similarly, if a date node does not contain a precise date range comprehensible by a computer, the date node may need to be converted. Otherwise, conversion is not needed. For example, "this year is not a precise date range comprehensible by a computer, and if this year is year 2013, it may need to be converted to a date node "2013."

Correspondingly, a logic word node may also need to be converted. For example, logic word nodes "also," "together with," "as well as," "in the meantime," and "in addition," etc., may be converted to "and" or "&"; and logic word nodes "either," and "otherwise" may be converted to "or."

An index-condition combination may be eventually achieved in the similar manner.

S32, constructing a node tree, according to the index-condition combinations.

Figure 5:
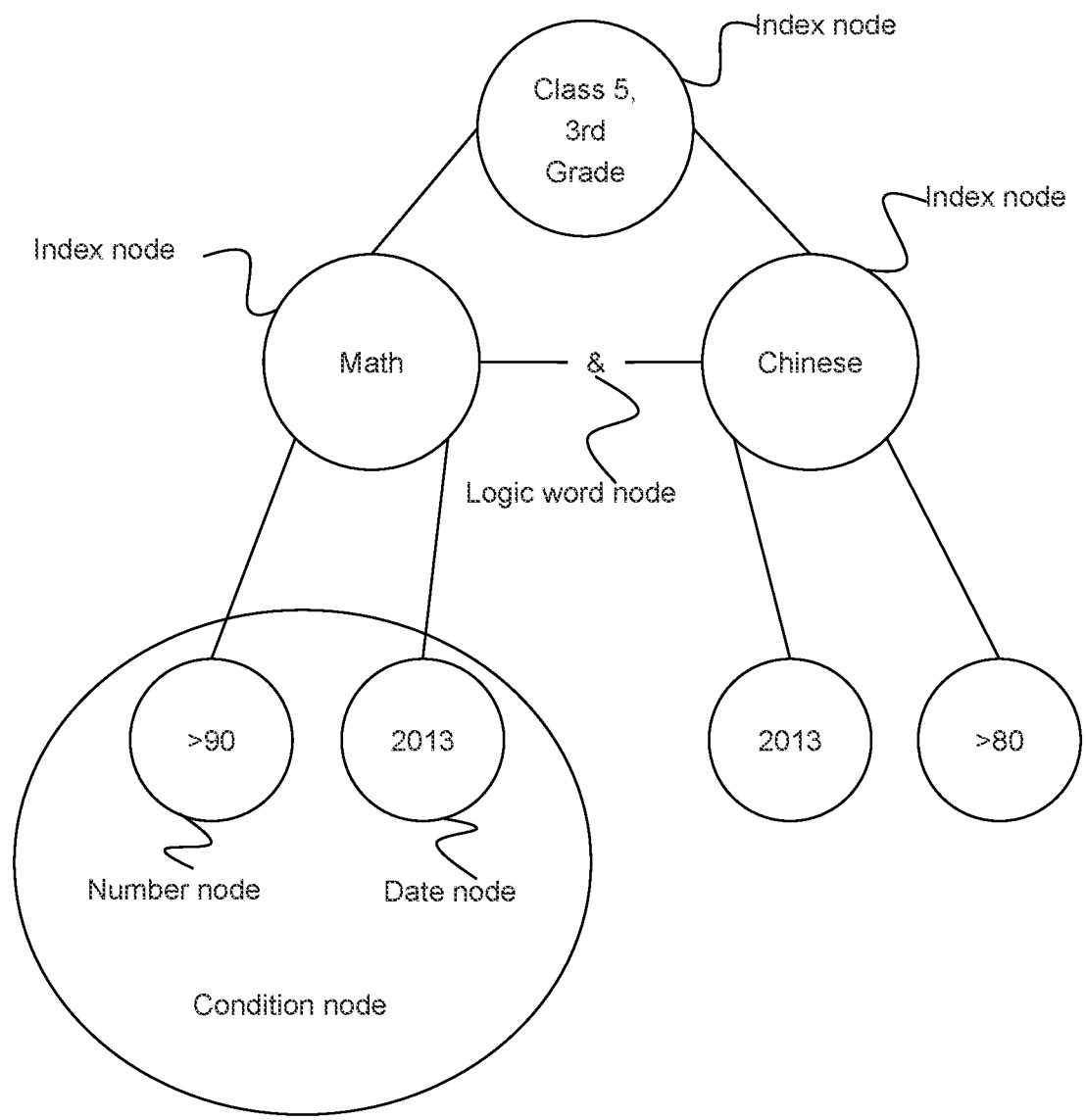
FIG. 5 is a schematic view of a node tree according to some embodiments of the present invention.

A node tree corresponding to "in year 2013, the students in room five, the 3rd grade whose math score is over 90 points and Chinese score is over 80 points" may refer to FIG. 5.

Additionally, it should be noted that every index node may have a corresponding condition node in a node tree. For example, "a stock with year over year (YOY) growth rates over 50% for three consecutive years" may include three index-condition combinations:

1) YOY growth rate in the most recent year (assuming year 2013)>50%:

2) YOY growth rate in last year (year 2012)>50%;

3) YOY growth rate in the year before last year (year 2011)>50%.

Figure 6:
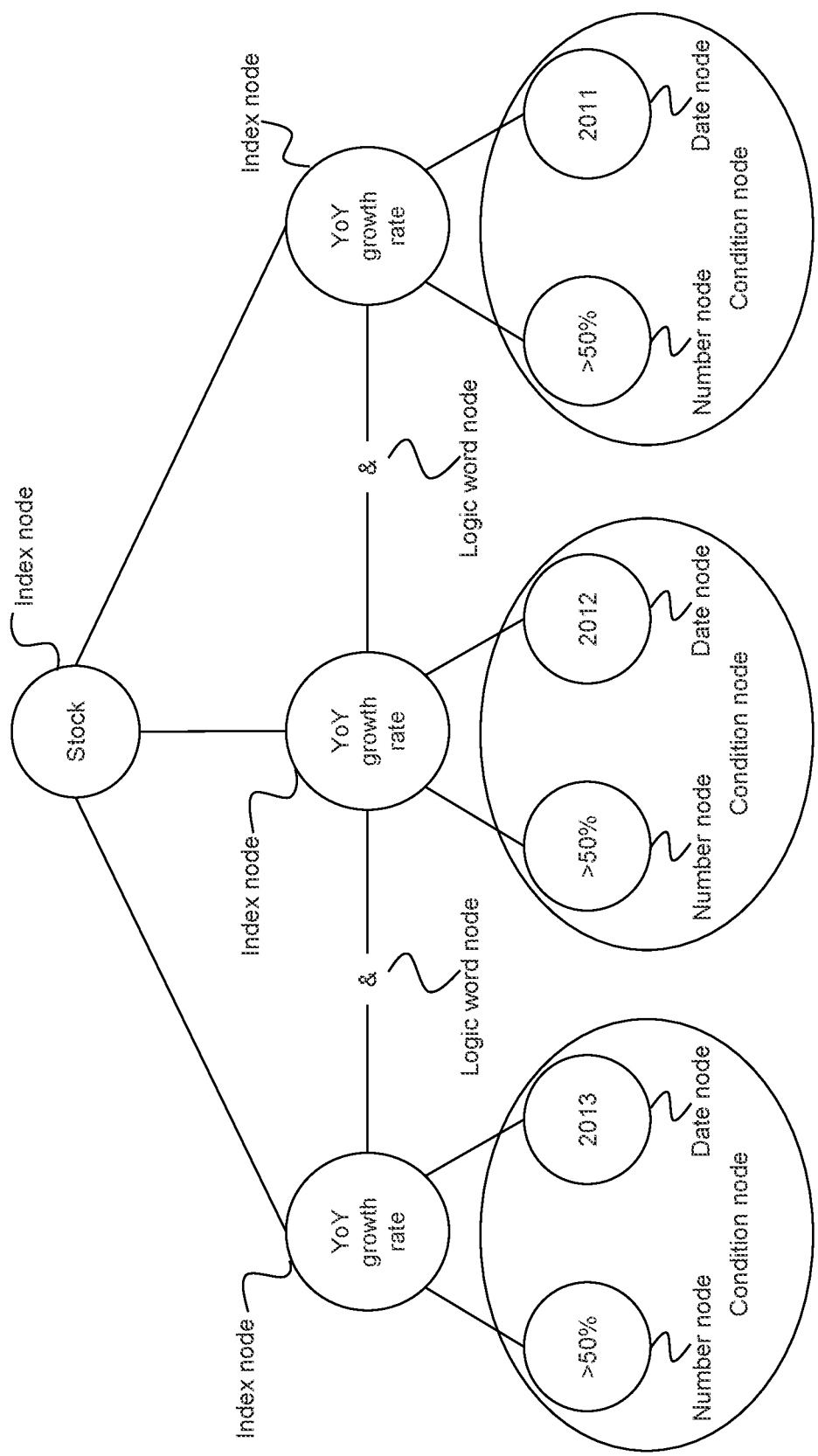
FIG. 6 is a schematic view of a node tree according to some embodiments of the present invention.

Therefore, according to FIG. 6, a node tree representing "a stock with year over year (YOY) growth rates over 50% for three consecutive years" may include three index nodes of "YOY growth rate," and each of the index nodes may correspond to a condition node.

Correspondingly, step S4 as described above may include:

determining a data source corresponding to an index node in the node tree; and translating the index node and a relevant condition node into a query command that may be consistent with the format requirement of the data source.

The reason for the above steps may be that data corresponding to different indexes may be stored in different data sources or databases and the supported format of the query command in various data sources may be different. Therefore, different formats of query commands may need to be translated based on the data sources.

Although the format query commands may be different, querying based on index-condition combinations may be applicable in every data sources. The present invention may utilize this characteristics and configure a command translation program for each data source based on its specific query command format. The translation program may be queried based on the index nodes and the condition nodes. Additionally, in an embodiment of the present invention, the sematic comprehension of sentence provided by a user and the acquisition of final data may be separated processes.

Correspondingly, filtering of the query results in Step S5 described above may include:

Combining and/or filtering a query result, according to the relationship between index nodes in the node tree.

Specifically, after obtaining query results, the results may be combined and filtered according to the logical relationship between indexes, and those satisfying all the combinations of index nodes and condition nodes may be reserved.

As an example of filtering, as demonstrated in the node tree in FIG. 6 and described above, the node tree illustrated in FIG. 6 representing "a stock with year over year (YOY) growth rates over 50% for three consecutive years" may include three index nodes of "YOY growth rate." and each of the index nodes may correspond to a condition node.

According to the query command, three types of query results may be obtained: the first type, stocks with YOY growth rate in the most recent year (assuming year 2013) >50%;

the second type, stocks with YOY growth rate in last year (year 2012)>50%;

the third type, stocks with YOY growth rate in the year before last year (year 2011)>50%.

According to the node tree in FIG. 6, the three index nodes may be connected by an "and" logic relationship, and based on this relationship, three types of query results mentioned above may be combined and filtered to generate stocks simultaneously satisfying YOY growth rate in 2013>50%, YOY growth rate in 2012>50%, and YOY growth rate in 2011>50%.

Moreover, it should be noted that, in the example of "a stock with year over year (YOY) growth rates over 50% for three consecutive years," the corresponding node tree may include three index nodes "YOY growth rate." when generating query commands, three query commands may be generated corresponding to the three index nodes, and the results may then be generated and filtered. Alternatively, a single query command may be generated to search for data that satisfies the conditions in all three indexes. In this case, it may be unnecessary to perform data filtering on query results.

With respect to combination, it mainly refers to the situation that indexes correspond to different data sources, and the query results may be combined after being obtained from a plurality of data sources.

Figure 7:
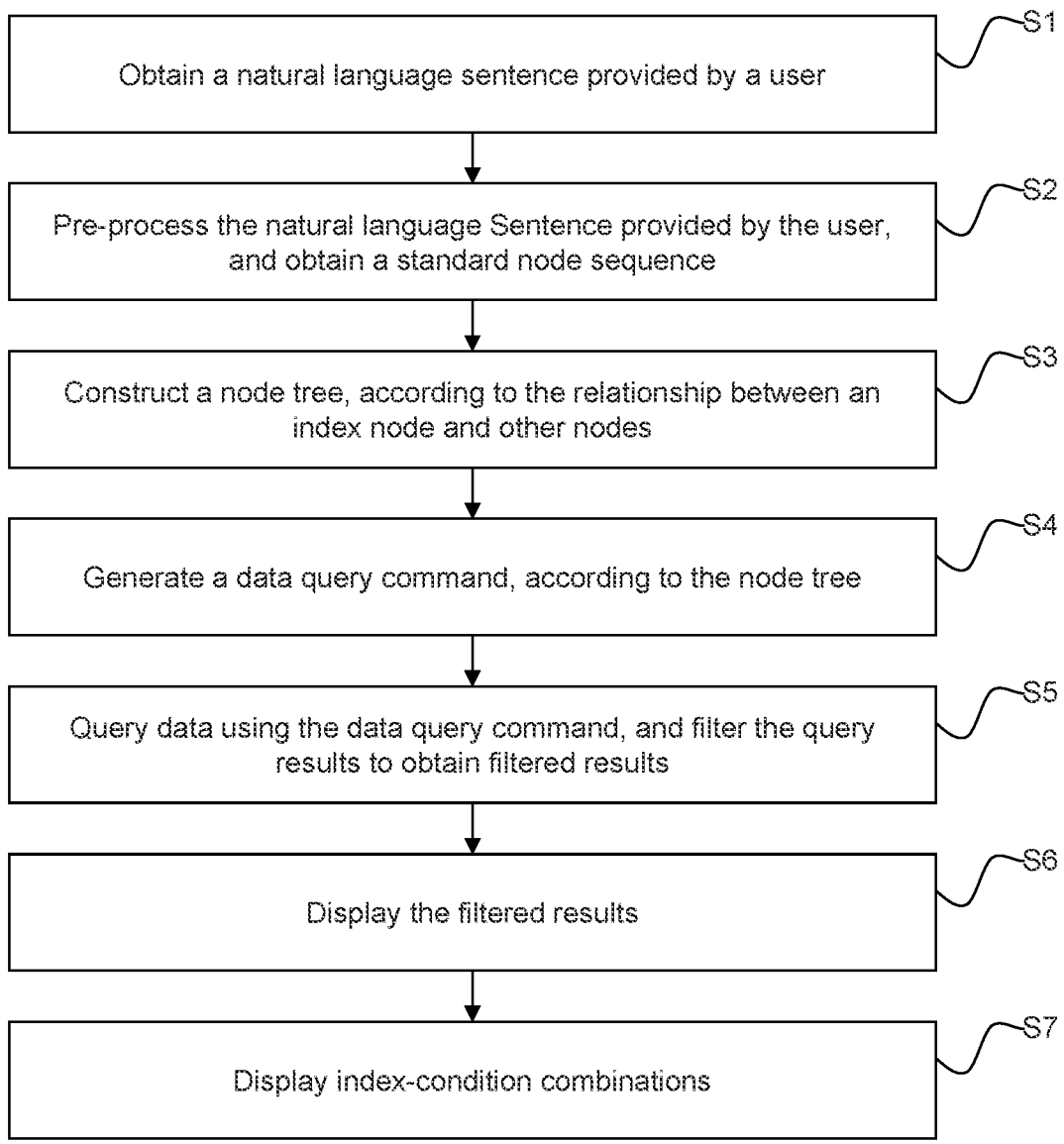
FIG. 7 is a flowchart of a process for query selection according to some embodiments of the present invention.

Referring to FIG. 7, other embodiments of the present invention, after step S6, may further include following steps:

S7, the query selection system displaying index condition combination.

Considering that a user may change indexes for a plurality of various reasons, in other embodiments of the present invention, the method described above may also include following steps:

Query selection system obtains condition changing command provided by a user; and After obtaining a condition changing command, the system may change conditions and regenerate data query command.

Correspondingly, the query selection system may include a command-changing unit to obtain condition changing command provided by a user to change conditions accordingly and regenerate data query command.

Specifically, condition changing may further include condition appending, condition amending, and condition deleting.

With respect to condition appending, a user may use a method similar to the known art to choose the indexes that need to be appended and configure restrictions corresponding to those indexes. The user may also append natural language conditions.

A button or icon may be set up so that command changing unit may be activated when the user click it.

Figure 8:
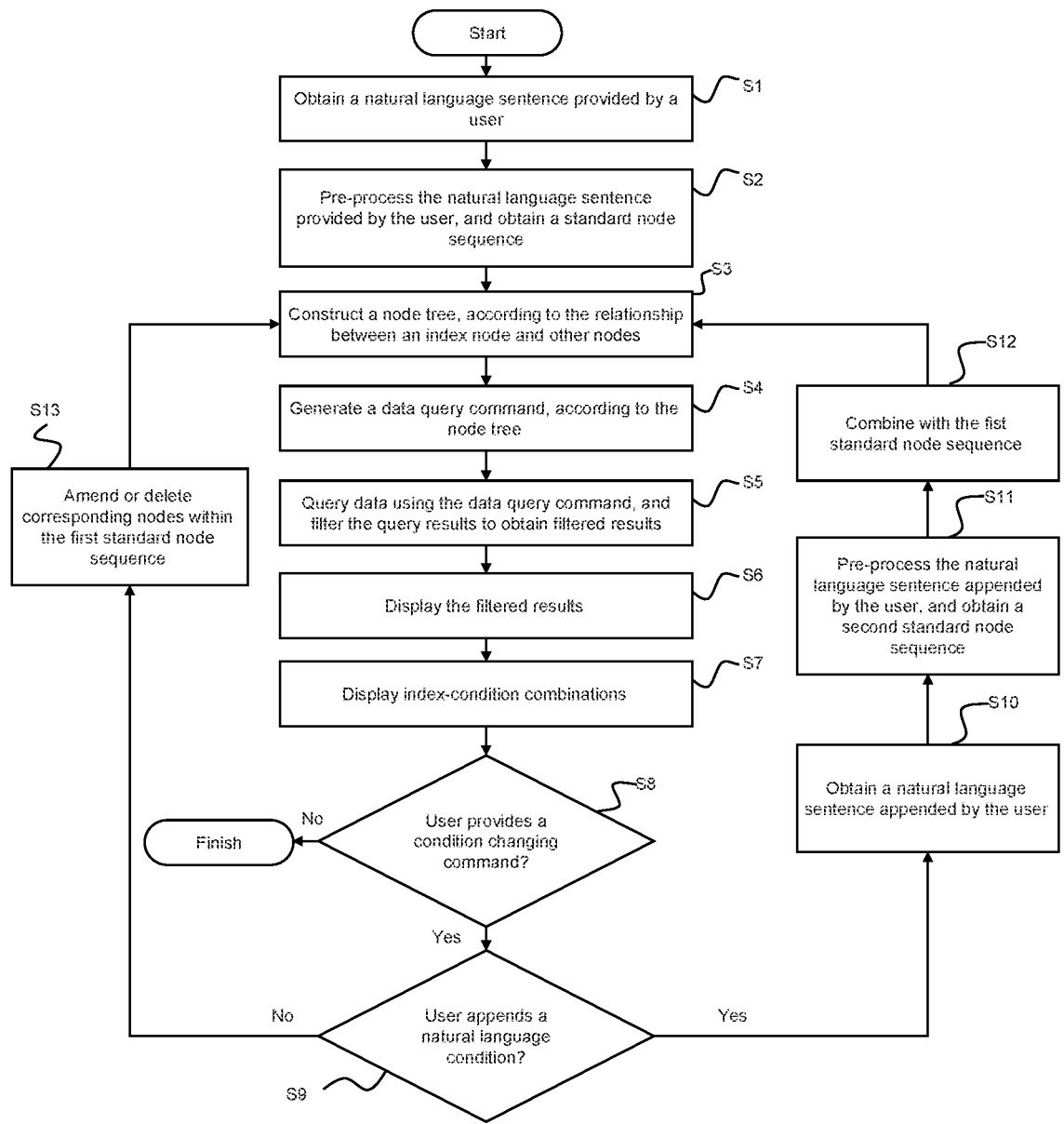
FIG. 8 is a flowchart of a process for query selection according to some embodiments of the present invention.

More specifically, referring to FIG. 8, if a user chooses to append conditions in natural language, then the natural language sentence appended by the user may be obtained (S10) (similar to S1), the appended natural language sentence may then be pre-processed to obtain a second standard node sequence (S11) (similar to S2), the second standard node sequence may be combined with the first standard node sequence to generate a new first standard node sequence, the query command may be regenerated (S3) and querying and filtering in step S4 may be proceeded to, depending on the query command.

However, if a user wishes to change only the conditions corresponding to some indexes, or delete only some conditions or indexes, the corresponding nodes of the first standard node sequence may be changed or deleted directly (S13) and step S3 may be further proceeded to.

For a specific implementation, after step S7, the query selection system may provide buttons "condition appending," "condition changing," and "condition deleting simultaneously to facilitate user's operations.

Figure 9:
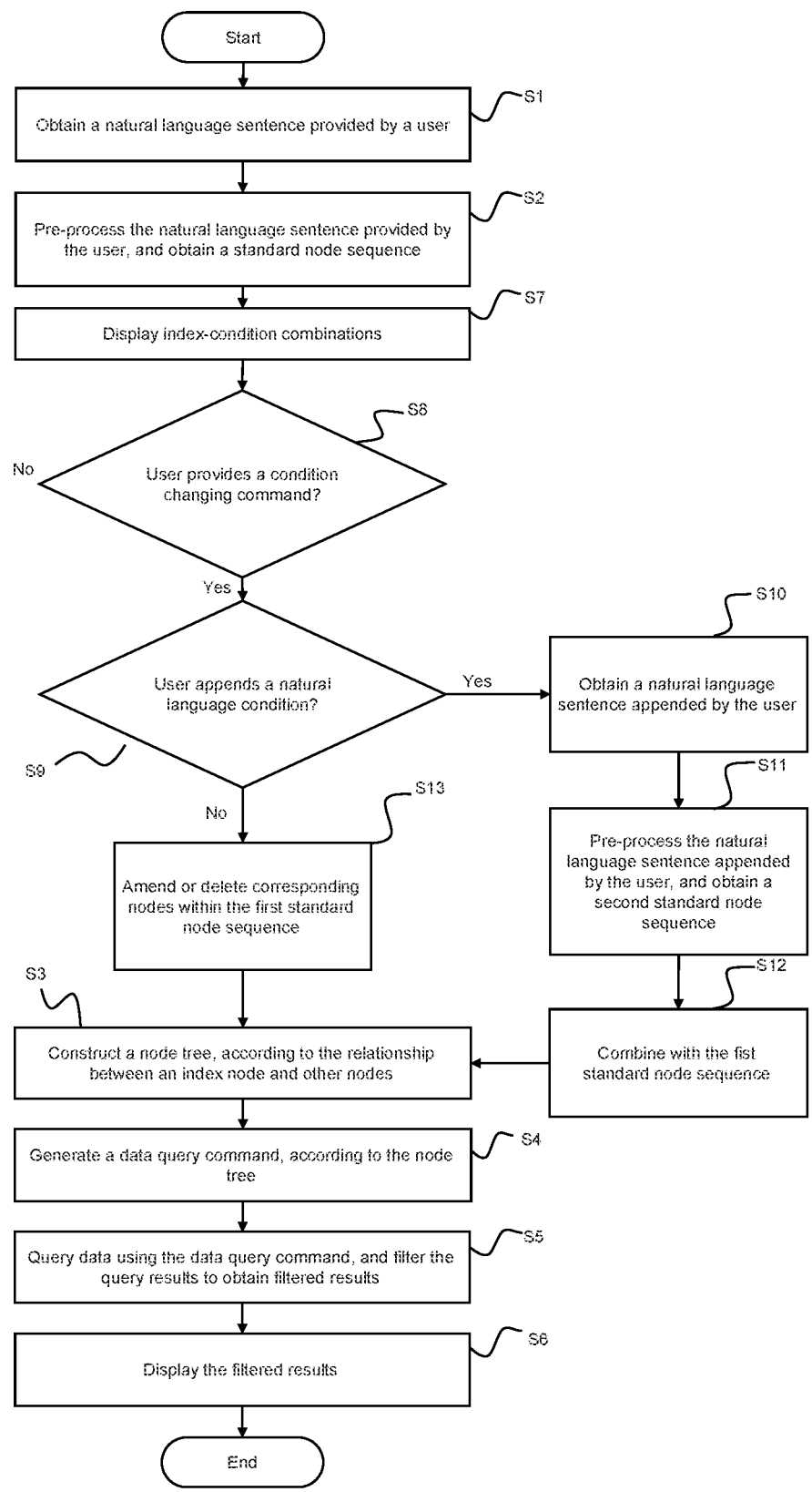
FIG. 9 is a flowchart of the query selection method according to Some embodiments of the present invention.

Besides, it should be noted that step S7 described above may be implemented before S3 (shown in FIG. 9), and the time a user chooses to change a condition may also be before the implementation of S3.

Figure 10:
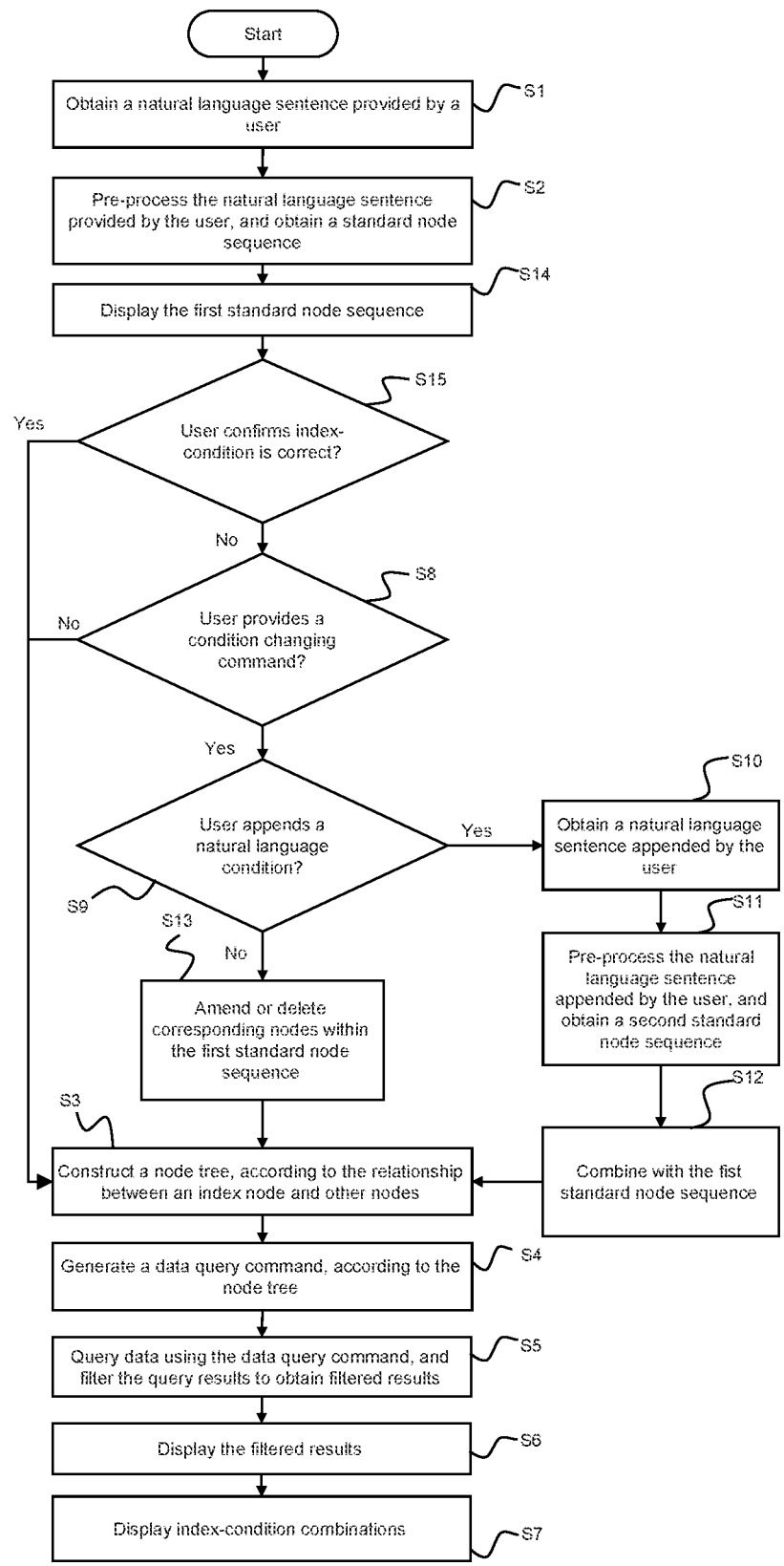
FIG. 10 is a flowchart of the query selection method according to some embodiments of the present invention.

Else, referring to FIG. 10, after step S2, the following steps may be included:

S14, displaying the first standard node sequence so that the user may acquire the system's "comprehension" of the index-condition combination;

For example, if a user inputs "the math score of Ming Li in class five, the 3rd grade," then it may be converted to a first standard node sequence "Grade 3rd Class Five Name Ming Li Subject math score" and displayed.

S15, determining whether the user confirms the correctness of the index condition.

A confirm button may be provided for a user. If the user confirms the correctness, S3 may be performed.

If the user confirms the incorrectness in index condition, then a condition changing command may be provided and condition appending, condition amending or condition deleting may be performed, which is not further discussed here.

For a specific implementation, after performing step S14, the query selection system may provide buttons "confirm," "condition appending," "condition amending," and "condition deleting" to facilitate user's operations.

The implementation process of the present invention may be described below via an example of "stocks with net profit increasing at over 50% for 3 consecutive years."

Step (1), a user may provide a natural language sentence "stocks with net profit increasing at over 50% for 3 consecutive years."

Step (2), a raw node sequence "stocks| with net profit| increasing| at over 50%| for 3 consecutive years." may be obtained, where "|" is used to separate nodes.

In this step, it can be made clear that stocks are to be searched. The characteristics of "net profit" and "increasing" provided by the configuration files may be used to convert the nonstandard phrasing in the raw node sequence to a standard phrasing "stocks with year over year (YOY) growth over 50% for 3 consecutive years."

Step (3), number node and time node may be analyzed.

In this embodiment, "over 50%" may be converted to ">50%, and "for 3 consecutive years" may be converted to a specific time scope expanding from the most recent year to the previous two years.

Step (4), a node tree may be constructed.

First, the number node ">50%" may be bound to the index "net profit (with year over year (YOY) growth) as a filtering condition and the time node "for 3 consecutive years" may be bound to it as a time parameter;

Because the characteristic of the time parameter bound to "net profit (with year over year (YOY) growth) is annual, "3 consecutive years' may be divided into three annual time nodes "the most recent year," "last year" and "the year before last year," and other nodes may be copied, finally a node tree representing three index conditions may be obtained (referring to FIG. 6).

It should be noted that when this stock selection demand is processed by a traditional stock selection tool, the user may typically be asked to choose the index "net profit (with year over year (YOY) growth)" three times separately, choose the year corresponding to each index and set a restriction "index over 50%" for each year, thus the operation may be complicated. However, the embodiment of the present invention only requires a user to provide a natural language sentence, which significantly simplifies the user's operations.

Step (5), the index-condition combinations above may be translated to a data query command.

First, the data source corresponding to the index "net profit (with year over year (YOY) growth)", may be determined, 3 index-condition combinations described above may then be translated to a supported query command according to the data sources format requirement on the query command.

Step (6), the query demand may be executed, and condition "net profit (with year over year (YOY) growth) >50%" may be used to filter out stocks which don't satisfy the condition.

Step (7), queried stocks and the corresponding net profit (with year over year (YOY) growth) may be displayed on an interface, and the obtained index-condition combination may also be presented to a user to check and examine.

Step (8), a user may choose to change conditions (i.e. to input a condition changing command as described above), such as appending a condition "Zhejiang Province," in order to obtain "stocks having net profit increase over 50% for 3 consecutive years" within "Zhejiang Province," Alternatively, a user may change ">50%" in "net profit (with year over year (YOY) growth) in the most recent year >50%" to "<30%," and reselect the stocks.

If the user do not further change conditions, the process may normally end.

It should be noted that the technical solutions provided by the embodiments of the present invention may be used in fields of searching, communication, industry, etc. A brief example in each field will be described below:

In the field of searching, when a user provides a natural language sentence on a website, the website server (namely query selection system) may perform steps S1 to S4, and convert the natural language sentence provided by the user to data query commands. The website server may then use data query commands to query the results, then filter the results (Step S5) and return and display filtered results on the client side, thus completing a search.

In the field of communication, for example, when a user inputs "call Ming Li," the cellphone (namely the query selection system) may, after performing steps S1 and S2, convert natural language sentence provided by the user to a standard node sequence "call contact Ming Li", where "contact" is an index node, and "Ming Li" is a character string node. In steps S3, S4 and S5, data command may be generated, contacts in the cellphone may be queried, and the phone number of "Ming Li" may be acquired and displayed. Thereafter, the method described above may further include giving a phone call (to "Ming Li') according to the query result of "Ming Li's" phone number.

In the field of industrial control (such as steelmaking), if a user inputs "maintain the temperature at 50 degree," the PLC (namely the query selection system) may, after performing steps S1 and S2, recognize an index node "temperature" and a number node "50 degree". In steps S3, S4, S5 and S6, PLC may generate data command, query the current temperature of the steelmaking product line and display it (the steelmaking product line may regularly uploads it current temperature to a database). The method described above may further include comparing the current temperature of the steelmaking product line with "50 degrees." If the former value is lower than the latter one, the temperature may be increased; otherwise, if the former value is higher than the latter one, the temperature may be decreased.

Accordingly, a query selection system may be within the scope of protection of the present invention, referring again to FIG. 1, this system may at least include;

an acquisition unit 1, configured to acquire a natural language sentence provided by a user;

a pre-processing unit 2, configured to pre-process the natural language sentence provided by the user, and obtain a first standard node sequence, wherein the node may include at least an index node and a condition node, wherein the condition node may further include at least one of a number node, a date node, or a character string node;

a node tree construction unit 3, configured to construct a node tree, according to the relationship between the index node and other nodes, wherein the node tree is configured to represent an index-condition combination;

a translation unit 4, configured to translate the node tree into a data query command;

a querying and filtering unit 5, configured to query data according to the data query command, and filter query result to obtain a filtered result; and a display unit 6, configured to display the filtered result.

The display unit 6 may also be used to display index condition combinations.

For specific details, please refer to the descriptions in the previous part of this disclosure and they are not further discussed here.

In other embodiments of the present invention, the query selection system described above may also include a changing unit to obtain condition changing command provided by a user and change conditions accordingly.

More specifically, the changing unit may further include condition appending unit and condition amending/deleting unit.

When a user provides appended a natural language sentence, the condition appending unit may obtain the appended natural language sentence provided by the user, pre-process them to obtain second standard node sequences, combine the second standard node sequences with the first standard node sequences, and then, instruct the node tree construction unit 3 to regenerate a data query demand.

The condition amending/deleting unit may amend or delete the corresponding nodes of the first standard node sequence according to user's operations of amending or deleting and then instruct the node tree construction unit 3 to regenerate data query command.

For specific details, please refer to the descriptions in the previous part of this disclosure and they are not further discussed here.

At last, it should be noted that the preprocess unit, the node tree construction unit, the translation unit, the filtering unit and command changing unit in this query selection system, may be hardware unit, electric circuit or logic unit. When these units are logic units, their respective functions may be completed by a processer.

Figure 11:
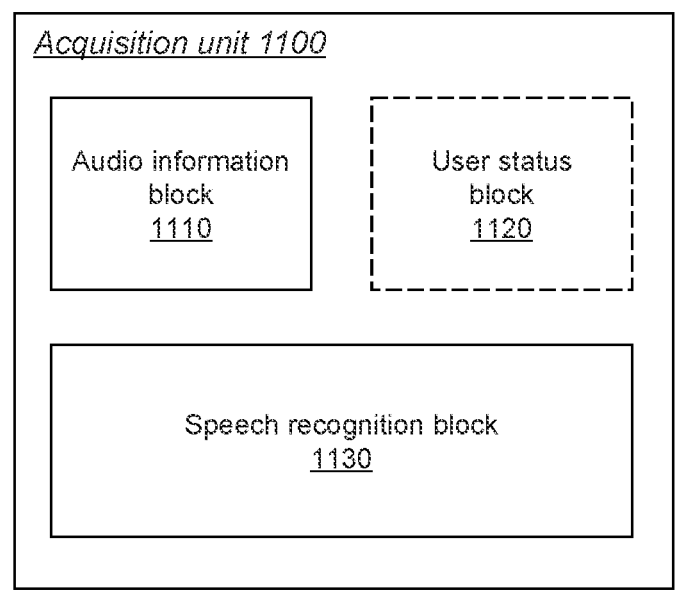
FIG. 11 is a schematic view of the structure of an acquisition unit according to some embodiments of the present invention.

FIG. 11 is a schematic view of the structure of an acquisition unit 1100 according to some embodiments of the present invention. The acquisition unit 1100 may be an example of the acquisition unit 1 as illustrated in FIG. 1 and may obtain a natural language sentence based on audio information (e.g., voice) inputted by a user. The acquisition unit 1100 may include an audio information block 1110, a user status block 1120 (optional), a speech recognition block 1130.

The audio information block 1110 may be configured to receive audio information inputted by a user via a voice input device. The audio information may be used for generating a natural language sentence for data querying.

The user status block 1120 may be configured to determine a user status indicator by detecting, via an electric sensor, a user status of the user when the user is inputting the audio information.

The speech recognition block 1130 may be configured to perform a speech recognition on the audio information received by the audio information block 1110 to obtain a natural language sentence. The speech recognition may be based on the user status indicator determined by the user status block 1120. The obtained natural language sentence may then be used to generate a node tree for querying data via any one of the aforementioned processes.

In some embodiments, the user status block 1120 may be removed from the acquisition unit 1100, and the speech recognition block 1130 may perform the speech recognition without using the aforementioned user status.

Figure 12:
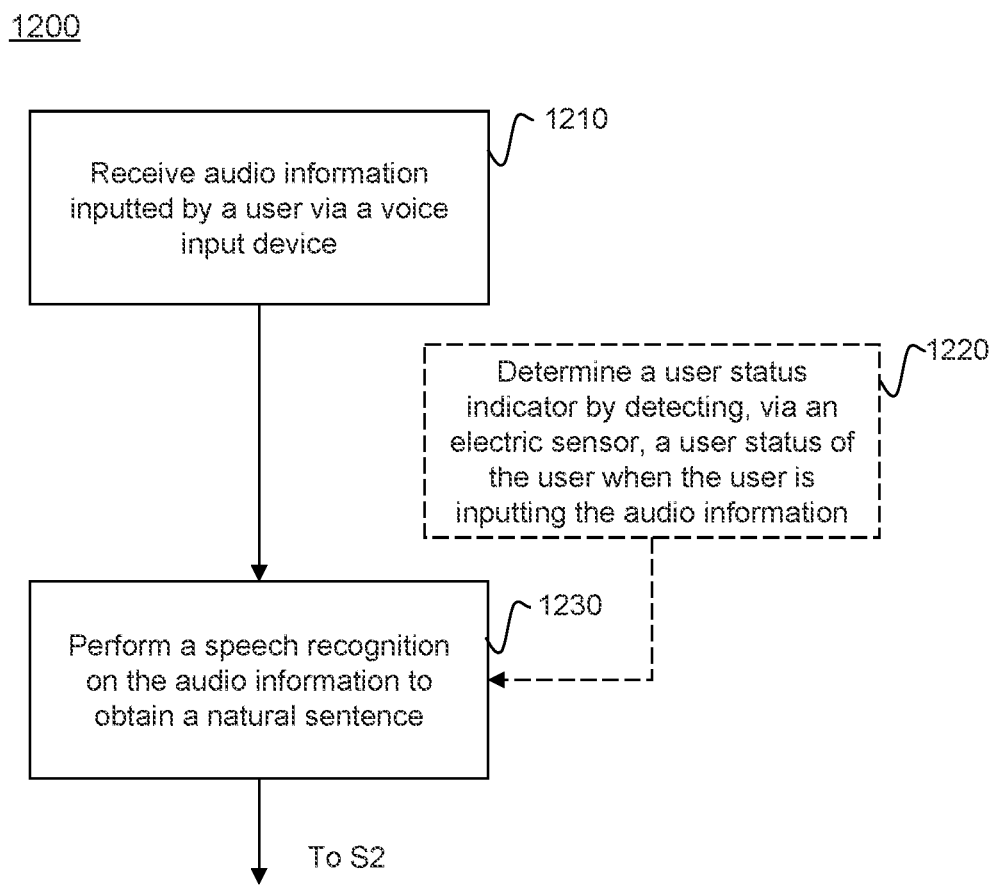
FIG. 12 is a flowchart illustrating an exemplary process for obtaining a natural language sentence according to some embodiments of the present invention.

Detailed descriptions of the above blocks of the acquisition unit 1100 may be found elsewhere in the present invention (e.g., in connection with FIG. 12).

FIG. 12 is a flowchart illustrating an exemplary process 1200 for obtaining a natural language sentence according to some embodiments of the present invention. The process 1200 may be implemented by the acquisition unit 1100 as illustrated in FIG. 11 or an embodiment thereof to achieve S1 of any one of the aforementioned processes. In some embodiments, the process 1200 illustrated in FIG. 12 may be stored in a storage device in the form of instructions, and invoked and/or executed by one or more processors.

In 1210, the audio information block 1110 may receive audio information inputted by a user via a voice input device (e.g., a microphone). The audio information may include a speech given by the user, which may include a command for data querying or for other desired operations. In some embodiments, the audio information block 1110 may preprocess the received audio information to reduce background noise and/or to enhance the voice command spoken by the user.

In 1230, the speech recognition block 1130 may perform a speech recognition on the audio information to obtain a natural language sentence, which may then be used for data querying via any one of the processes described in the present invention. Any proper technique related to speech recognition may be adopted by the speech recognition block 1130 for obtaining the natural language sentence. For example, the speech recognition may be based on a hidden Markov model (HMM), a dynamic time warping (DTW) model, a neural network model (e.g., a recurrent neural network (RNN) model, or the like, or a combination thereof.

In some embodiments, the speech recognition model adopted by the speech recognition block 1130 may include a feature extraction sub-model, an acoustic sub-model, and a language sub-model. The feature extraction sub-model may extract features from the audio information and provide a plurality of feature vectors. The acoustic sub-model may transform the plurality of feature vectors into a plurality of phonemes. The language sub-model may transform the plurality of phonemes into a plurality of words in the form of one or more sentences (i.e., the natural language sentence for data querying).

In practice, some words of a speech may be ambiguous due to factors including, e.g., similar pronunciation (homonyms), accent of the user, or the like, or a combination thereof. Inaccurately recognized natural language sentence may cause a wrongly conducted data querying, leading to a waste of user's time and computation resources. To improve the accuracy of the speech recognition, in some embodiments, the process 1200 may further include an operation 1215 to enhance the speech recognition. It is noted that the operation 1215 may be optional in the process 1200 and may be removed or be replaced by any other similarly purposed operation(s) in some embodiments of the present invention.

In 1220, the user status block 1120 may determine a user status indicator by detecting, via an electric sensor, a user status of the user when the user is inputting the audio information. The "user status," as used herein, may relate to any information describing a status of the user when the user is inputting the audio information. For example, the user status may relate to at least one of a physical condition, a mental condition, an activity, an expression, the current location, or an environment of the user, or the like, or a combination thereof. The electric sensor may be any proper sensor for sensing the corresponding user status, such as a camera, an electrode, a Global Position System (GPS) sensor, a lidar, a sonar, an infrared radiation (IR) sensor, a medical sensor, or the like, or a combination thereof. The user status indicator may include one or more descriptors of the user status detected by the electric sensor and may be subjected to the operation 1230. Then in 1230, the speech recognition block 1130 may perform the speech recognition based on the user status indicator.

For instance, a user may query data about nearby "flour/flower" shops. Normally, it is difficult to recognize the word is "flower" or "flour" solely based on the audio information. However, by taking the user status into consideration, the accuracy of the recognition may be greatly improved. Exemplary embodiments, which may be implemented separately or in combination to give a solution of the above case, are provided as following. These embodiments are only for demonstration purposes and not intended to be limiting.

Embodiment I: the user status block 1120 may detect a surrounding environment/location of the user using a camera, a GPS sensor, and/or a lidar. If the user status block 1120 identify that the surrounding environment/location of the user is home/kitchen, there may be a great chance that the word is "flour." If the surrounding environment is identified as street/club, there may be a great chance that the word is "flower."

Embodiment II: the user status block 1120 may detect the expression or mood of the user using a camera, an electrode, and/or an IR sensor. If the user is identified as in a neutral mood or impatient, there may be a great chance that the word is "flour." If the user is identified as being smiling or happy, there may be a great chance that the word is "flower."

Embodiment III: the user status block 1120 may detect the activity of the user using a camera and/or a lidar. If the user is identified to be doing housework (e.g., cooking), there may be a great chance that the word is "flour." If the user is identified to be strolling or dining, there may be a great chance that the word is "flower."

The health status, gender, age, etc., (e.g., detected by a medical device and/or a camera) of the user may also facilitate the speech recognition.

In some embodiments, the user status block 1120 may use one or more models for identifying one or more aspects of the user statuses. For example, the one or more models may include a neural network based model, a decision tree based model, a face recognition model, or the like, or a combination thereof. Each of the one or more models may take data collected by the corresponding electric sensor as its input and output a label for describing the corresponding aspect. For example, a convolutional neural network (CNN) based model for identifying the expression of the user may output a label, which is a code corresponding to the identified expression. The obtained label(s) may be used to generate the user status indicator and then be transmitted to the speech recognition block 1130 to facilitate the speech recognition. For example, when multiple labels are obtained, the user status block 1120 may sequentially concatenate the multiple labels to form a combined vector as the user status indicator.

In some embodiments, the speech recognition may be performed based on historical activity information of the user. The historical activity information may include information related to historical input of the user, historical data querying conducted by the user, historically detected user status, (e.g., relating to location, expression, activity of the user), historically obtained user status indicators, or the like, or a combination thereof. The user status block 1120 may analyze the historical information of the user (e.g., using a classifier based on a machine learning algorithm such as a decision tree algorithm, a random forests algorithm, a CNN algorithm, an RNN algorithm, a ResNet algorithm) for determining the user status indicator of the user. In different embodiments, the user status indicator may be determined based on only the currently detected user status, based on only the historical activity information, or based on both the currently detected user status and historical activity information. Other factors may also be used for determining user status indicators.

Then in 1230, the speech recognition block 1130 may perform a speech recognition on the audio information to obtain the natural language sentence based on the user status indicator. In sortie embodiments, the language sub-model of the speech recognition model utilized by the speech recognition block 1130 for speech recognition may take the user status indicator as part of its input, and generate the natural sentence as its output.

For instance, the user status indicator may relate to the mood/expression of the user. To train such a language sub-model, each piece of text in the corpus for training may be associated with an indicator (or be referred to as a training indicator) indicating the mood/expression associated with the piece of text. Such a training indicator and the user status indicator as the training input of the sub-model may share the same format. The training indicators may be manually assigned to pieces of text in the corpus, or be automatically identified using an analysis model based on the corresponding piece of text and/or the context thereof.

The obtained natural language sentence may then be used to generate a standard node sequence (e.g., the first/second standard node sequence) via the operation S2 of any one of the aforementioned processes of the present disclosure.

In some embodiments, the audio information block 1110 may also acquire audio information for another use. For example, a user identity unit (not shown) of the query selection system may identify the identity of the user based at least in part on the audio information and obtain identity information thereby. Based on the identity information of the user, the user identity unit may perform a next operation accordingly. For example, the user identity unit may cause the query selection system to abandon the data querying process for an unauthorized user for safety issues, and optionally warn the user about deny of permission. As another example, the user identity unit may cause the query selection system to perform the data querying process using setting or rules specialized (or customized) for different users to facilitate the data querying process.

In some embodiments, the data generated by the electric sensor may also be used for identifying the identity of the user. For example, the aforementioned user identity unit may perform a face recognition on a face image of the user captured by a camera or an IR sensor (as the electric sensor) when the user is inputting the audio information. Based on the face recognition result, the user identity unit may perform a next operation (e.g., deny of permission for an unauthorized user) accordingly.

In some embodiment, the user identity unit may perform the identification based on both the data generated by the electric sensor and the audio information to improve the accuracy of the identification.

In some embodiments, the user identity unit may perform the identification using any other related technology. For example, the user identification may be based on bio-information of the user such as finger-print or iris information.

It is noted that the above descriptions of the process 1200 are only for demonstration purposes, and not intended to be limiting. It is understandable that, after learning the major concept of the present invention, a person of ordinary skills in the art may alter the process 1200 in an uncreative manner. For example, the operations above may be implemented in an order different from that illustrated in FIG. 12. One or more optional operations may be added to the flowcharts. One or more operations may be split or be combined. For example, the operations 1110 and 1120 may be performed concurrently or sequentially. As another example, the operation 1120 may be split into a user status detecting step (which may also be merged into the operation 1110) and a user status indicator generating step (which may also be merged into the operation 1130). All such modifications are within the scope of the present invention.

Figure 13:
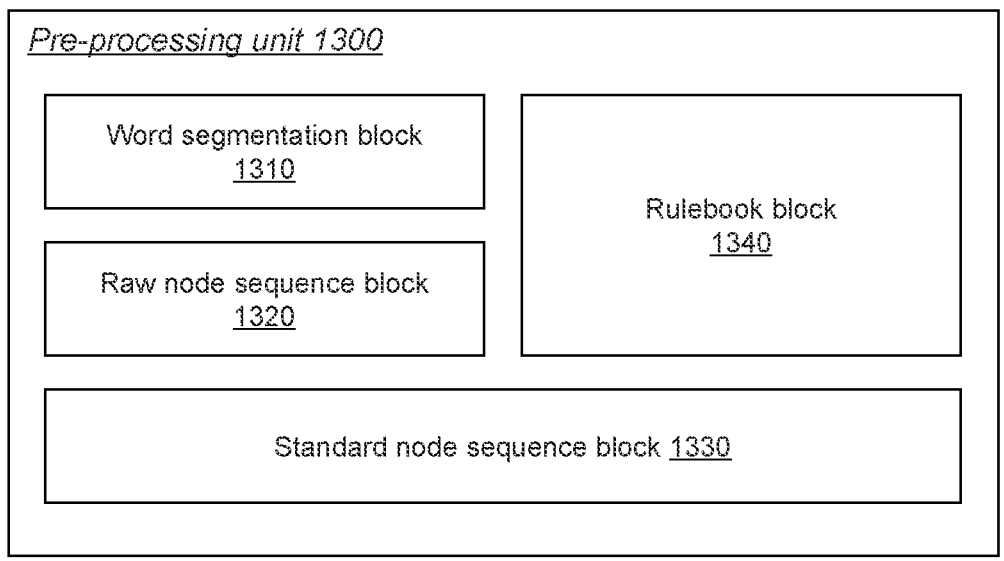
FIG. 13 is a schematic view of the structure of a pre-processing unit according to some embodiments of the present invention.

FIG. 13 is a schematic view of the structure of a pre-processing unit 1300 according to some embodiments of the present invention. The pre-processing unit 1300 may be an example of the pre-processing unit 2 as illustrated in FIG. 1 and may pre-process the natural language sentence obtained via the operation S1 or the process 1200 to obtain a standard node sequence (e.g., the first/second standard node sequence). The pre-processing unit 1300 may include a word segmentation block 1310, a raw node sequence block 1320, a standard node sequence block 1330, and a rulebook block 1340.

The word segmentation block 1310 may be configured to perform word segmentation on the natural sentence and obtain multiple words or phrases.

The raw node sequence block 1320 may be configured to construct a node for each of the multiple words or phrases and obtain a raw node sequence. The raw node sequence may include at least one node, each node of the at least one node in the raw node sequence including a word or a phrase of the multiple words or phrases.

The standard node sequence block 1330 may be configured to convert the raw node sequence to a standard node sequence in response to a detection (by the standard node sequence block 1330) that the raw node sequence is non-standard. The standard node sequence block 1330 may convert the non-standard raw node sequence to the standard node sequence according to a conversion rule set.

The rulebook block 1340 may be configured to retrieve rules from the aforementioned configuration file (or be referred to as a rulebook) for performing the conversion of the non-standard raw node sequence. In some embodiments, the rulebook block 1340 may also selectively provide one or more rules to the standard node sequence block 1330 as the aforementioned conversion rule set. For example, the rulebook block 1340 may select one or more rules according to identity information of the user as at least part of the conversion rule set. The identity of the user may be determined via a user identity unit (not shown) of the query selection system as illustrated in FIG. 1.

Figure 14:
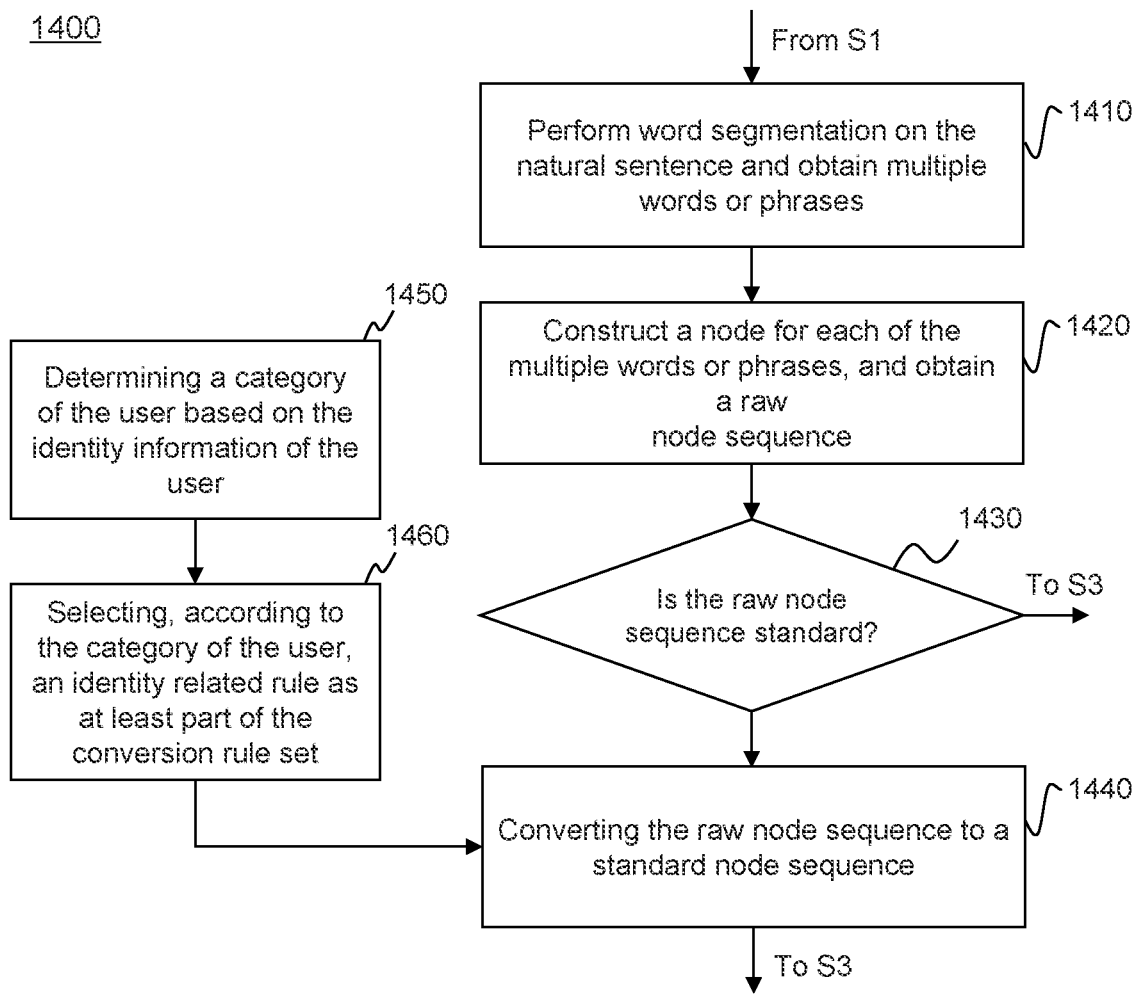
FIG. 14 is a flowchart illustrating an exemplary process for obtaining a standard node sequence based on a natural language sentence according to some embodiments of the present invention.

Detailed descriptions of the above blocks of the pre-processing unit 1300 may be found elsewhere in the present invention (e.g., in connection with FIG. 14).

FIG. 14 is a flowchart illustrating an exemplary process 1400 for obtaining a standard node sequence based on a natural language sentence according to some embodiments of the present invention. The process 1400 may be implemented by the pre-processing unit 1300 as illustrated in FIG. 13 or an embodiment thereof to achieve S2 of any one of the aforementioned processes. In some embodiments, the process 1400 illustrated in FIG. 14 may be stored in a storage device in the form of instructions, and invoked and/or executed by one or more processors.

In 1410, the word segmentation block 1310 may perform word segmentation on the natural sentence and obtain multiple words or phrases.

In 1420, the raw node sequence block 1320 may construct a node for each of the multiple words or phrases and obtain a raw node sequence.

The operations 1410 and 1420 may be the same as or similar to the operations S21 and S22 as illustrated in FIG. 3, which are not repeated herein.

In 1430, the standard node sequence block 1330 may determine whether the raw node sequence is standard by examining key words and matching the characteristics of specific phrasing (e.g., as described in connection with the step S23). In response to a detection that the raw node sequence is standard, the standard node sequence block 1330 may output the raw node sequence as a standard node sequence, which may then be subjected to the step S3 of any one of the aforementioned processes. In response to a determination that the raw node sequence is non-standard, the standard node sequence block 1330 may convert the raw node sequence to a standard node sequence via the operation 1440 according to conversion rules provided by the rulebook block 1340. In some embodiments, the rulebook block 1340 may provide the conversion rules based on identity information of the user (e.g., identified by the aforementioned user identity unit) via the operations 1450 and 1460.

In 1450, the rulebook block 1340 (or the user identity unit) may determine a category (or label) of the user based on the user identity information obtained by the user identity unit. For example, the rulebook block 1340 may search the user identity information in a lookup table. Items of the lookup table may each represent an association between a corresponding pre-registered user and his/her category.

The category of the user may belong to a plurality of preset categories according to the user identity information. The plurality of preset categories may be used for grouping users according to practical needs. For example, the plurality of preset categories may include "authorized user", "unauthorized", "registered", "unregistered", "paid user", "premium user", "free user", "high-risk user", "low-risk user", etc. As another example, the plurality of preset categories may relate to jobs, user levels, genders, ages, physical status, mental status, or the like, or a combination thereof.

In 1460, the rulebook block 1340 may select, according to the category of the user, one or more identity related rules as at least part of the conversion rule set, and provide the conversion rule set to the standard node sequence block 1330. For example, each of the plurality of preset categories may be associated one or more rules specialized for the class in the rulebook. The rulebook block 1340 may obtain the rule(s) associated with the category of the user from the rulebook as the one or more identity related rules. In some embodiments, there may be one or more common rule(s) shared by all the plurality of preset categories. The rulebook block 1340 may also retrieve the common rule(s) as the other part of the conversion rule set. Then in operation 1440, the standard node sequence block 1330 may convert the raw node sequence according to the conversion rule set provided by the rulebook block 1340.

The one or more identity related rules may improve the efficiency for the corresponding class of user to query data, or may provide extra safety to the data to be requested. The one or more identity related rules may be preset by the system or customized by a corresponding user. Exemplary identity related rules may include, when one or more corresponding conditions are satisfied: adding or removing indexes, proceeding or skipping the data querying, displaying information, hiding or masking at least a part of data querying result, or the like, or a combination thereof.

For example, a user may input a natural sentence "show me the students who failed the last math examination and their correspondence information." A raw node sequence may be generated including "students| failed| last| math examination| correspondence". As the user does not provide any information regarding to the class or grade of the students, without considering a use's identity, the obtained standard node sequence may include "Target|Student|Math Score|<60|TIME|20180105|Display|Correspondence", wherein the nodes "Target", "Students", "Math Score", "<60", "TIME" and "20180105" may be used for generating a corresponding node tree for querying data, and the nodes "Display", "Correspondence" may be used for specifying the data to be displayed. Consequently, the user may get a search result including students failed to pass the math examination in all the classes, all the grades and their correspondence information. If the user is only in charge of the class 4th, grade 3rd, and only want to query correspondence information about students of the class 4th, grade 3rd, the user may have to conduct the querying again with extra effort to provide such information. If the user has no permission for the correspondence information but is authorized for the list of students failed the math examination, with traditional solutions, the user may either improperly obtain the unauthorized information or be warned that the data querying will not be performed due to the lack of permission.

However, in embodiments of the present invention, the identity information of the user may be obtained in real-time. In the above case, the user may be identified as in a category "supervisor of the class 4th, grade 3rd". A rule (a system default rule or a rule set by the user) associated with such a category may constrain the data querying scope in the students of class 4th, grade 3rd when no information regarding to class or grade is provided. Therefore, the standard node sequence block 1330 may convert the raw node sequence into a standard node sequence "Target|students|Class|4|Grade|3|Math Score|<60|TIME|20180105|Display|Correspondence", and the user may obtain the required information with higher efficiency and less effort. As another example, the user may be identified as in a category "assistant supervisor of the class 4th, grade 3rd". Besides the above rule, another rule associated with such a category may specify that the correspondence information of the students is not permitted. Therefore, the standard node sequence block 1330 may convert the raw node sequence into a standard node sequence including "Class|4|Grade|3|Math Score|<60|TIME|20180105", and a data querying may be conducted accordingly. Consequently, a list of students in the class 4th, grade 3rd who failed the math examination may be displayed to the user, but the unauthorized correspondence information may not be displayed (or be masked). Optionally, the user may be warned that the requested correspondence information is unauthorized, and the user may determine whether to ask for such a permission according to the list provided.

As another example, a user may input a natural sentence "show me the stocks with net profit increasing at over 50% last year and is predicted to have a rise over 10% in the next month. A raw node sequence may be generated including "stocks, with net profit increasing, over 50%, last year, predicted to have a rise, over 10%, next month". Without considering the use's identity, the obtained standard node sequence may include "Target|Stocks|YOY growth|>50%|Time|2018|Predicted growth|>10%|Time|201902." However, the index "predicted growth" may only be accessible by a premium user. If the user is not a premium user, the user may only be warned with insufficient rank and the required data querying may not be conducted at all. The user may have to input a voice command again to at least search for stocks with net profit increasing at over 50% last year.

However, in embodiments of the present invention, the user may be identified as in a category "normal user". A rule (a system default rule or a rule set by the user) associated with such a category may include: when a premium-only index and one or more common indexes are specified by the user in a single command, ignoring the premium-only index. Then, the standard node sequence block 1330 may convert the raw node sequence into a standard node sequence "Target|Stocks|YOY growth|>50%|Time|2018", and the user may at least obtain a list of stocks with YOY growth above 50% in 2018. The user may then further filter the obtained list based on the content of the list, and the data querying efficiency may be improved.

The above examples are only for demonstration purposes and not intended to be limiting. Similar concept may be adopted in other application scenarios without inventive modifications.

In some embodiments, the converting of the raw node sequence or natural language sentence to the standard node sequence may be performed using a machine-learning algorithm as described before. The category of the user, the user status indicator, the data detected by the electric sensor, and/or the historical information of the user as described before may also be inputted into the model implementing the machine-learning algorithm as a part of its input, so that the accuracy of the converting result may be improved. Correspondingly, to train such a model, the training database of the model may further include the corresponding data as a part of the training input.

It is noted that the above descriptions of the process 1400 are only for demonstration purposes, and not intended to be limiting. It is understandable that, after learning the major concept of the present invention, a person of ordinary skills in the art may alter the process 1400 in an uncreative manner. For example, the operations above may be implemented in an order different from that illustrated in FIG. 14. One or more optional operations may be added to the flowcharts. One or more operations may be split or be combined. For example, the operations 1450 and 1460 may be performed concurrently with the operations 1410 to 1440. As another example, the operations 1450 and 1460 may be performed in response to the determination result of the operation 1430. All such modifications are within the scope of the present invention.

Figure 15:
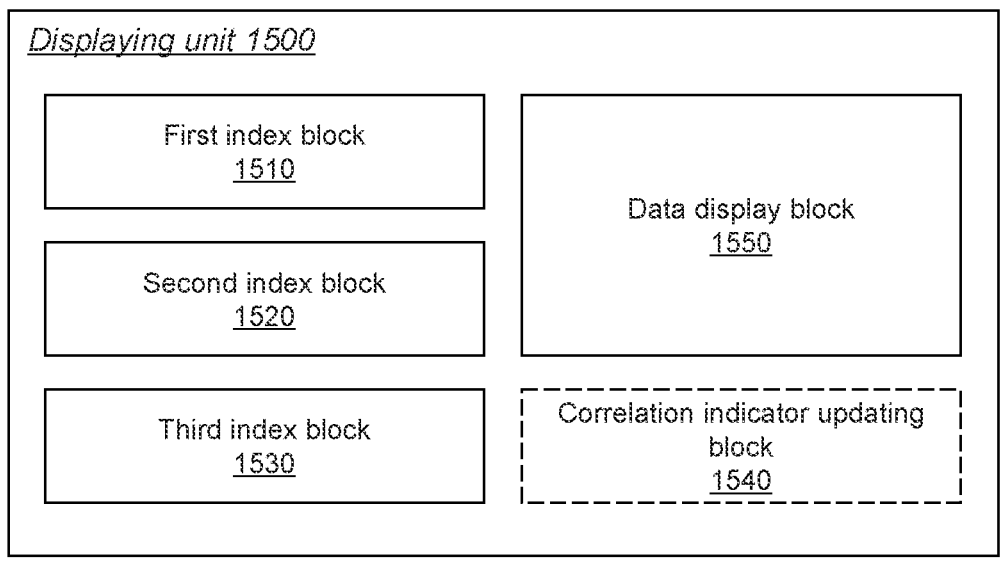
FIG. 15 is a schematic view of the structure of a display unit 1500 according to some embodiments of the present invention.

FIG. 15 is a schematic view of the structure of a display unit 1500 according to some embodiments of the present invention. The display unit 1500 may be an example of the display unit 6 as illustrated in FIG. 1 and may display the filtered result obtained via the operation S5 of any one of aforementioned data querying processes. The pre-processing unit 1500 may include a first index block 1510, a second index 1520, a third index block 1530, a correlation indicator updating block 1540 (optional), and a data display block 1550.

The first index block 1510 may identify a first index corresponding to an index node of the standard node sequence.

The second index block 1520 may select, from indexes of one or more databases, one or more second indexes based on correlation indicators of the indexes of the one or more databases with respect to the first index.

The third index block 1530 may identify a third index in response to an operation of a user.

The correlation indicator updating block 1540 may update the correlation indicator of the third index with respect to the first index.

In some embodiments, the correlation indicator updating block 1540 may be removed from the display unit 1500.

The data display block 1550 may display data of items of the filtered result obtained by the querying and filtering unit 5. For example, the data display block 1550 may display data of the items corresponding to the above first index, second index, and/or the third index.

Detailed descriptions of the above blocks of the pre-processing unit 1300 may be found elsewhere in the present invention (e.g., in connection with FIG. 14).

Figure 16:
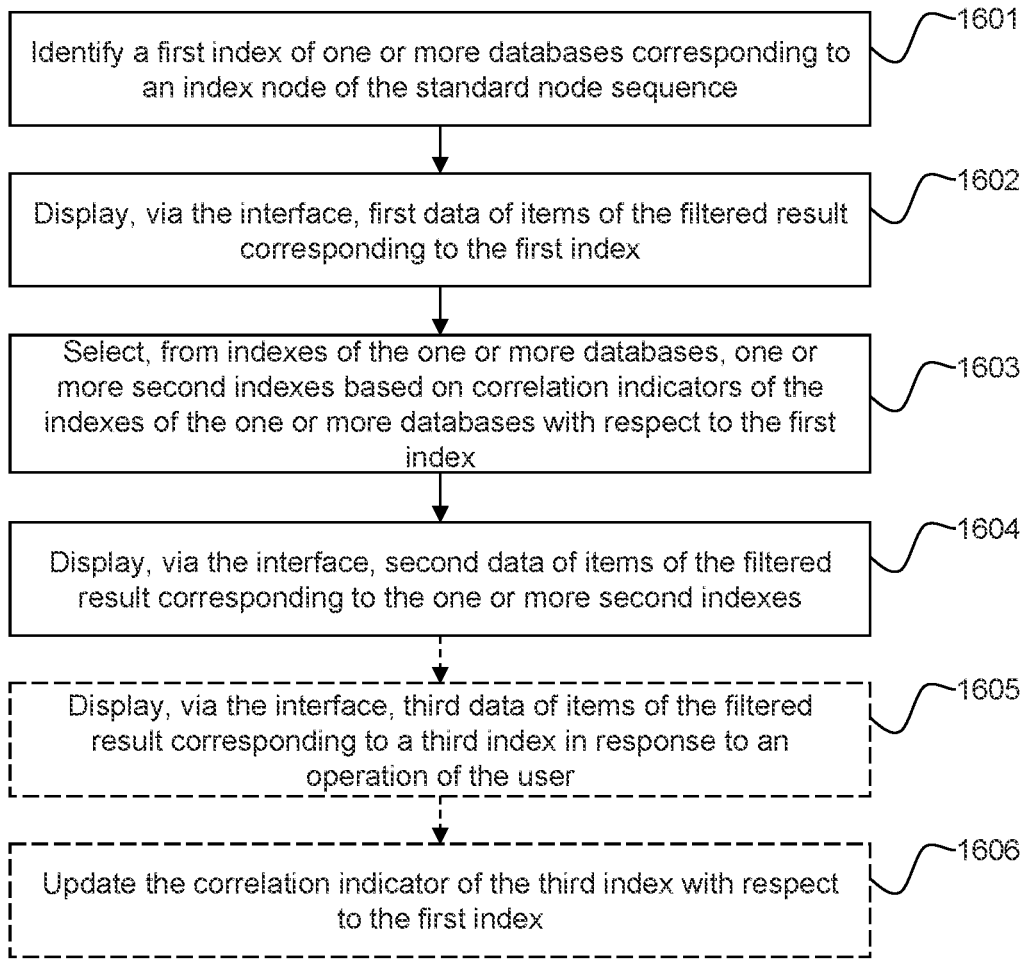
FIG. 16 is a flowchart illustrating an exemplary process 1600 for displaying the filtered result according to some embodiments of the present invention.

FIG. 16 is a flowchart illustrating an exemplary process 1600 for displaying the filtered result according to some embodiments of the present invention. The process 1600 may be implemented by the display unit 1500 as illustrated in FIG. 15 or an embodiment thereof to achieve S6 of any one of the aforementioned processes. In some embodiments, the process 1600 illustrated in FIG. 16 may be stored in a storage device in the form of instructions, and invoked and/or executed by one or more processors.

In 1601, the first index block 1510 may identify a first index corresponding to an index node of the standard node sequence used for obtaining the filtered result to be displayed. Then in 1602, the data display block 1550 may display, via the aforementioned interface, first data of items of the filtered result corresponding to the first index. The data display block 1550 may display the first data in any one of proper graphic forms, such as a table and/or a chart.

The first index may be an index of one or more databases from which the data is to be queried and be identified based on one or more index nodes included in the standard node sequence. In some embodiments, the first index block 1510 may use a lookup table to identify the first index corresponding to the index nodes. Items of the lookup table may each represent an association between an index node and a corresponding index of the one or more databases.

For example, when a user inputs a natural language sentence as "show me the top ten students in the last math examination." The corresponding standard node sequence may be "Target|Students|Math ranking|>10|TIME|20180105 |", which may include index nodes "Students" and "Math ranking." The data querying may be conducted on a database recording scores of the students. The first index block 1510 may identify (e.g., using a lookup table) that the first index corresponding to the index node "Math ranking" may be the index "MATH RANKING" of the database, and the index node "Students" may correspond to no index of the database. Then the data display block 1550 may display data (first data) under the first index "MATH RANKING" of items of the filtered result. In some embodiments, the data display block 1550 may display the first data in the form as illustrated in FIG. 17.

FIG. 17 is a schematic view of the displayed first data according to some embodiments of the present invention. The first data as well as any other data to be displayed may be displayed in the form as a table. The table may include columns corresponding to indexes "NAME" and "MATH RANKING" of the database for displaying the corresponding data (including the first data), wherein the index "MATH RANKING" may be the first index identified in the operation 1601, and the index "NAME" may be an index (or be referred to as a default index) of the database set to be displayed in default.

Refer back to FIG. 16. The operations 1601 and 1602 may be performed for displaying any data requested by the user. However, data of the indexes (except the default index) corresponding to no node of the standard node sequence may not be displayed just by performing the operations 1601 and 1602. In many situations, there may be one or more indexes (second indexes) strongly correlated to the first index, and a user may often want to obtain data corresponding to a second index although not expressively specify the second index in the natural language sentence for data querying. For example, in the above case, a user want to know the top ten students in the math examination may often want to know their corresponding math scores. However, if the index "MATH SCORE" is not set as a default index (which is the common case), the data display block 1550 may not display the data corresponding to "MATH SCORE" if only the operations 1601 and 1602 are performed, and the user may have to make extra effort to "ask" the query selection system to display such data (e.g., by inputting another natural language sentence or any other proper means), and the data querying efficiency may be reduced.

In embodiments of the present invention, operations 1603 to 1606 may be performed to avoid such embarrassment.

In 1603, the second index block 1520 may select, from indexes of the one or more databases, one or more second indexes based on correlation indicators of the indexes of the one or more databases with respect to the first index. Then in 1604, the data display block 1550 may display, via the interface, second data of items of the filtered result corresponding to the one or more second indexes. The standard node sequence may include no node corresponding to the one or more second indexes.

Each of the correlation indicators may indicate the strength of the correlation between the corresponding index and the first index. The correlation indicators may be preset by the query selection system or the user. For example, the correlation indicators may be obtained by analyzing the Big Data collected from a plurality of users by operating one or more algorithms (e.g., via a Factorization Machines (FM) algorithm, a DeepFM algorithm). As another example, the correlation indicators may be obtained by priori knowledge such as one or more rules, functions, knowledge graphs.

In some embodiments, the correlation indicators may be updated according to the user's operations for displaying or hiding a specific index.

The second index block 1520 may use various approaches to select the one or more second indexes based on the correlation indicators. In some embodiments, the second index block 1520 may perform a ranking on the correlation indicators, and select a predetermined number of indexes according to the ranking (e.g., top 1, top 2, top 3) as the one or more second indexes. In some embodiments, the second index block 1420 may select the indexes whose correlation indicator is above a predetermined threshold as the one or more second indexes.

For example, in the above case, the indexes of the database for data querying may include "NAME", "MATH SCORE", "MATH RANKING", "PHYSICS SCORE", "PHYSICS RANKING", "ENGLISH SCORE", "ENGLISH RANKING", and "TOTAL RANKING". The index "NAME" is a default index, and the index "MATH RANKING" is identified as the first index in the operation 1601. The correlation indicators of the above indexes with respect to the first index may be 1, 0.9, 1, 0.7, 0.5, 0.4, 0.3, and 0.8. The second index block 1520 may select the top 1 index or an index whose correlation indicator is equal to or more than 0.9 (the index "MATH SCORE") as the second index to be displayed although an index node corresponding to the index "MATH SCORE" is not presented in the standard node sequence for data querying.

In some embodiments, the second data and the first data may be displayed concurrently on the interface (e.g., as illustrated in FIG. 18). FIG. 18 is a schematic view of the concurrently displayed first data and second data according to some embodiments of the present invention. As illustrated in FIG. 18, the table for displaying the first data may further include a column corresponding to the identified second index "MATH SCORE" for displaying the corresponding second data, even when the corresponding index node is not presented in the standard node sequence for data querying.

In some embodiments, the second data and the first data may be displayed in a cycling manner. For example, the interface may display the first data, clear the first data, display the second data, clear the second data, display the first data, clear the first data, . . . , and so on. As another example, the interface may display the first part of the first & second data, the second part of the first & second data, the last part of the first & second data, the first part of the first & second data, . . . , and so on.

In some embodiments, the second data and the first data may be displayed in a summary manner, that is, the second data and/or the first data may not be displayed fully or displayed in detail on the interface at first. For example, the interface may only display a part (e.g., representative data, earlier retrieved data) of the first data and/or the second data. As another example, the interface may display a chart representing a summary or analysis of the first data and/or the second data (e.g., the number of the items of the filtered result, the mean/median/mode of numbers included in the first/second data) without specific details. The interface may display the non-displayed data or details of the first/second data in response to an operation of the user. The operation may include inputting a voice command, making a gesture or motion, operating a graphic element of the interface via an input device such as a mouse or a touchscreen, or the like, or a combination thereof.

In some embodiments, when multiple first indexes are identified in the operation 1601, for each first index, the second index block 1520 may identify one or more second indexes. In some embodiments, all the identified second indexes may be displayed via the interface. Alternatively, the second index block 1520 may select one or more indexes from the identified second indexes for data displaying. For example, for each of the second indexes, the second index block 1520 may compute a statistic metric (e.g., a mean, a sum, a median, a mode, etc.) of the correlation indicators of the second index with respect to all of the multiple first indexes. Then the second index block 1520 may select the one or more indexes based on the statistic metrics (e.g., via a ranking). In some embodiments, a second index identified with respect to a first index may happen to be another first index identified in the same standard node sequence. The computing of the statistic metric of such a second index may be skipped.

It is noted that, the correlation indicator of an index A with respect to an index B may be or may not be the same as the correlation indicator of the index B with respect to the index A. The correlation between the index A and the index B may be asymmetric in some embodiments of the present invention. For example, the correlation indicator of the index "MATH RANKING" with respect to the index "MATH SCORE" may be 0.9, while the correlation indicator of the index "MATH SCORE" with respect to the index "MATH RANKING" may be 0.8.

Refer back to FIG. 16. Although via the operations 1603 and 1604 a user may obtain desired data without expressively specified it in the natural language sentence, in many situations, the user may still want to obtain extra data corresponding to indexes faded to be selected as a second index, or hide data of an index selected as a second index against the user's will. In embodiments of the present invention, the process 1600 may also include optional operations 1605 and/or 1606 to further improve the data querying efficiency and the satisfaction of the user.

In 1605, the data display unit 1550 may further display, via the interface, third data of items of the filtered result corresponding to a third index (e.g., different from the first index and the second index(es) selected) in response to an operation of the user. The third index may be specified by the operation of the user and be identified by the third index block 1530. For example, the user may input another natural language sentence to specify the third index to be displayed. The natural language sentence may be processed by the pre-processing unit 2 or 1300 to generate a standard node sequence. The third index block 1530 may then identify a third index corresponding to an index node (or be referred to as a supplementary index node) of the third standard node sequence. For example, in the above case the third natural language sentence may be "Show the total ranking", A standard index node sequence may be obtained as "Display-|total ranking", including a supplementary index node "total ranking". The third index "TOTAL RANKING" may then be identified, and the corresponding third data may then be displayed by the data display unit 1550.

It is noted that, the user may also specify the third index by operating graphic elements of the interface via an input device instead of inputting the third natural language.

In some embodiments, the third data, the first data, and the second data (if any) may be displayed by the interface concurrently. (e.g., as illustrated in FIG. 19). FIG. 19 is a schematic view of the concurrently displayed first data, second data, and third data according to some embodiments of the present invention. As illustrated in FIG. 19, the table for displaying the first data may further include a column corresponding to the third index "TOTAL RANKING" specified by the user for displaying the corresponding third data. In some embodiments, the third data, the first data, and the second data may be displayed by the interface in the aforementioned cycling manner or summary manner.

In 1606, the correlation indicator updating block 1540 may update the correlation indicator of the third index with respect to the first index. Take the above case as an example, when the index "TOTAL RANKING" is specified by the user as the third index, the correlation indicator updating block 1540 may increase the correlation indicator of the third index "TOTAL RANKING" with respect to the corresponding first index "MATH RANKING" from, e.g., 0.8, to, e.g., 0.81. If the correlation indicator of the index "TOTAL RANKING" with respect to the index "MATH RANKING" is in a increasing trend, eventually, the index "TOTAL RANKING" may be automatically selected as a second index by the query selection system, and the user may not have to use extra operations to display the index "TOTAL RANKING" when only the index "MATH RANKING" is specified in the natural language sentence for data querying.

In some embodiments, optionally, the correlation indicator updating block 1540 may update (e.g., increase) the correlation indicators of the third index with respect to all the indexes displayed by the interface (e.g., another first index, a second index). For example, in the above case, the correlation indicator updating block 1540 may update the correlation indicators of the index "TOTAL RANKING" with respect to the corresponding first index "MATH RANKING" (e.g., increase by 0.1) and the second index "MATH SCORE" (e.g., increase by 0.1 or 0.05).

In some embodiments, the user may find that a second index is automatically selected by the query selection system against his/her will. The user may take an operation (e.g., inputting a natural language sentence specifying the second index, operating a graphic element of the interface) to hide the data of the corresponding second index. The correlation indicator updating block 1540 may then update (e.g., decrease) the correlation indicator of such a second index with respect to the corresponding first index. In some embodiments, the correlation indicator updating block 1540 may update (e.g., decrease) the correlation indicators of such a second index with respect to all the indexes displayed by the interface (e.g., another first index, a third index). For example, in the above case, when the second index "MATH SCORE" is hide by the user, the correlation indicator updating block 1540 may update the correlation indicators of the index "MATH SCORE" with respect to the corresponding first index "MATH RANKING" (e.g., decrease by 0.1) and the third index "TOTAL RANKING" (e.g., decrease by 0.1 or 0.05). If the correlation indicator of the index "MATH SCORE" with respect to the index "MATH RANKING" is in a decreasing trend, eventually, the index "MATH SCORE" may not be automatically selected as a second index by the query selection system.

By updating the correlation indicators with respect to the user's operation, the user may obtain desired information with improved efficiency and less effort.

In some embodiments, the supplementary index may correspond to an index (or be referred to as a fourth index) not included in the one or more databases on which the data querying is performed. The data display unit 1550 may retrieve a computing mean for computing data of the fourth index based at least in part on data of one or more fifth indexes included in the indexes of the one or more databases. The computing mean may be in the form of a function, a lookup table, a logical model, a physical circuit, or the like, or a combination thereof.

For example, a fourth index "AVERAGE SCORE" may be a fourth index specified by a user of which the data is to be computed. The data display unit 1550 may retrieve a function for computing the data corresponding to the "AVERAGE SCORE." For example, the function may compute the mean of the math score, the physics score, and the English score as the data corresponding to the index "AVERAGE SCORE". Then the data display unit 1550 may retrieve data of fifth indexes "MATH SCORE", "PHYSICS SCORE", and "ENGLISH SCORE" to compute the data of the fourth index "AVERAGE SCORE" based on the retrieved data, and then display the obtained data.

In some embodiments, a fourth index may also be associated with one or more correlation indicators with respect to different indexes of the one or more databases, and may be automatically selected as a special "second index" of which the data may be computed in real-time.

The term "fourth index" and "third index" may be equivalent and may be used interchangeably. Data of the fourth index and the above first/second/third data may be displayed in a concurrent manner, a cycling manner, or a summary manner.

It is noted that the above descriptions of the process 1600 are only for demonstration purposes, and not intended to be limiting. It is understandable that, after learning the major concept of the present invention, a person of ordinary skills in the art may alter the process 1600 in an uncreative manner. For example, the operations above may be implemented in an order different from that illustrated in FIG. 14. One or more optional operations may be added to the flowcharts. One or more operations may be split or be combined. All such modifications are within the scope of the present invention.

In some embodiments, a single natural language sentence inputted by a user may include a part representing a modification to be made to another part of the natural language sentence, especially when the user is inputting the natural language sentence using a voice input mean. For example, the user may input a natural language sentence as "show me the stocks with net profit increasing at over 50% last year, wait, change it to 30%". Without providing specific operations or conversion rules towards such a situation, a raw node sequence may be generated including "stocks| with net profit increasing| over 50%|last year|30%". The node 30% may correspond to no index node and a standard node sequence may not be successfully generated. The system may warn the user with an error information and abort the data querying.

Figure 20:
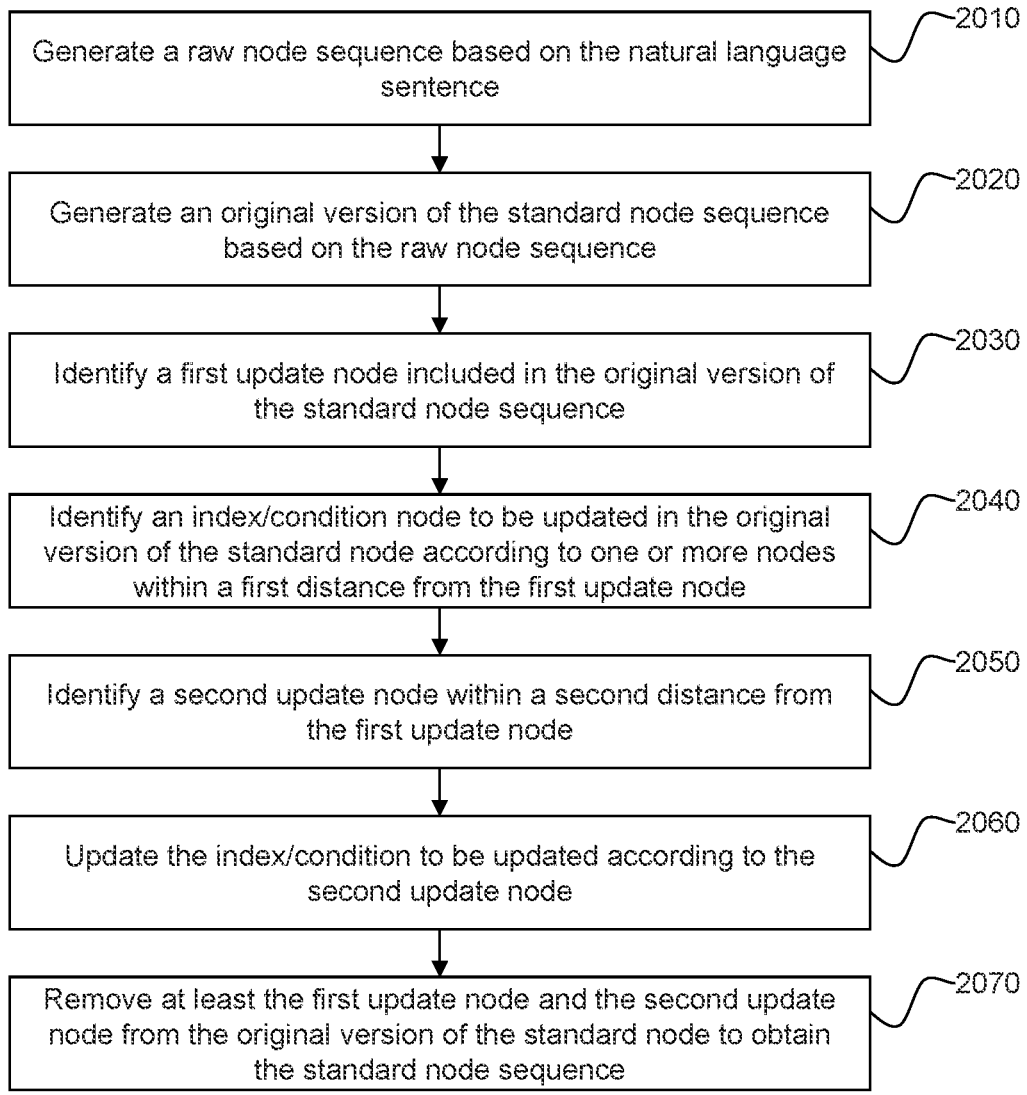
FIG. 20 is a flowchart illustrating an exemplary process 2000 for handing a natural language sentence including updating information according to some embodiments of the present invention.

FIG. 20 is a flowchart illustrating an exemplary process 2000 for handing a natural language sentence including updating information according to some embodiments of the present invention. The process 2000 may be implemented by the pre-processing unit 2 as illustrated in FIG. 1 or an embodiment thereof and may be included in S2 of any one of the aforementioned processes. In some embodiments, the process 2000 illustrated in FIG. 20 may be stored in a storage device in the form of instructions, and invoked and/or executed by one or more processors.

In the process 2000, words or phrases such as "change", "modify", "delete", may also be converted into nodes. Such a node (first update node) may indicate an update of the information is to be performed.

In 2010, the pre-processing unit 2 may generate a raw node sequence based on the natural language sentence. The operation 2010 may be similar to the operations S21 and S22, while words or phrases indicating a modification is to be made (e.g., "change", "modify", "delete", "remove") may also be converted into nodes. For example, in the above case, the generated raw node sequence may include "stocks| with net profit increasing| over 50%|last year|change| it| to 30%".

In 2020, the pre-processing unit 2 may generate an original version of the standard node sequence based on the raw node sequence. The operation 2010 may be similar to the operations S23. For example, in the above case, the original version of the standard node sequence may be "Target|stocks|YOY growth|>50%|Time|2018|Change|Unknown| to 30%."

In 2030, the pre-processing unit 2 may identify a first update node included in the original version of the standard node sequence. The first update node may indicate an update of the standard node sequence is to be performed. In the above case, the first update node may be identified as the node "Change".

In 2040, the pre-processing unit 2 may identify an index/condition node to be updated in the original version of the standard node according to one or more nodes within a first distance from the first update node. The term "distance" may represent the number of nodes from the first update node. For example, in the node sequence "Target|stocks|YOY growth|>50%|Time|2018|Change|Unknown| to 30%", the distance from the node "Change" to the node "to 30%" is 2, and the distance from the node "Change" to the node "Unknown" is 1.

The first distance may be a predetermined distance and may be set with a proper number such as 1, 2, 3. Taking the distance as 2 for example, the nodes having a distance within 2 from the first update node "Change" may include "Unknown" and "to 30%". The node "Unknown" may indicate the node to be updated is to be searched based on another node, and the node "to 30%" may suggest the node to be updated is a condition node (or more specifically a number node). Then the pre-processing unit 2 may search for all the number nodes in the standard node sequence before the first update node. As there is only one number node (>50%) in the original version of the standard node sequence before the first update node, the only number node ">50%" may be identified as the index to be updated.

In some embodiments, there may be more than one number node (or other type of condition node) in the original version of the standard node. For example, for a natural language sentence "show me the stocks with a YOY growth over 50% for the last two years, no, change it to 30%", a corresponding standard node sequence may be "Target-|stocks|YOY growth|>50%|Time|2018|YOY growth|>50%|Time|2017|Change|Unknown| to 30%". The pre-processing unit 2 may find two equal number nodes (">50%") accompany with the same index nodes ("YOY growth") in the standard node sequence. The pre-processing unit 2 may identify both the number nodes as the index to be updated. As another example, for a natural language sentence "show me the stocks with a YOY growth over 50% for the year 2018, and a predicted YOY growth over 10% for the year 2019, no, change it to 30%", a corresponding standard node sequence may be "Target|stocks|YOY growth|>50%|Time|2018|predicted YOY growth|>10% Time|2019|Change|Unknown| to 30%", the pre-processing unit 2 may find two different number nodes (">50%" and ">10%") accompany with the different index nodes ("YOY growth" and predicted "YOY growth") in the standard node sequence. The pre-processing unit 2 may identify the nearest number node (">10%") as the index to be updated. The same identification manner may also be adopted in the situation where different number nodes accompanying with the same index nodes.

In some embodiments, the user may specify the index to be updated in the natural language sentence. For example, for a natural language sentence "show me the stocks with a YOY growth over 50% in 2018, no, change the stocks to funds", a corresponding standard node sequence may be "Target|stocks|YOY growth|>50%|Time|2018|Change|stocks| to funds". The pre-processing unit 2 may first identity that the node "stocks" within the first distance represents the node to be updated (e.g., by counting the serial number of the node starting from the first update node and the total number of nodes within the first distance, by detecting a lack of predetermined words such as "to" or "by"), search for an index node most similar to the node "stocks", and then designate the found node as the node to be updated.

In 2050, the pre-processing unit 2 may identify a second update node within a second distance from the first update node. The second update node may indicate how to update the index/condition node to be updated. The second distance may be the same as or different from the first distance. For example, the second distance may also be set as 2. In some embodiments, the pre-processing unit 2 may identify the nodes within the second distance including predetermined words such as "to" or "by" as the second update nodes. In some embodiments, a first update node may also be a second update node. For example, a first update node "remove" or "delete" may also be regarded as a second update node.

In 2060, the pre-processing unit 2 may update the index/condition node to be updated according to the second update node. For example, for a standard node sequence "Target|stocks|YOY growth|>50%|Time|2018|Change|Unknown| to 30%", the pre-processing unit 2 may change the number node >50% into >30%. As another example, for a standard node sequence "Target|stocks|YOY growth|>50%|Time|2018|Increase|50%| by 10%", the pre-processing unit 2 may change the number node >50% into >60%. As a further example, for a standard node sequence "Target|stocks|YOY growth|>50%|Time|2018|predicted YOY growth|>10%|Time|2019|Remove|predicted YOY growth", the pre-processing unit 2 may remove the index node "predicted YOY growth" and the accompany nodes ">10%", "Time", and "2019".

The pre-processing unit 2 may then remove at least the first update node and the second update node from the original version of the standard node. In some embodiments, a node representing the node to be updated may also be removed as well. For example, for a standard node sequence "Target|stocks|YOY growth|>50%|Time|2018|Change|Unknown| to 30%", after changing the node >50% into the node ">30%", the nodes "Change", "Unknown", "to 30%" may be removed, and the obtained standard node sequence may be "Target|stocks|YOY growth|>30%|Time|2018", which may be normally used in the data querying.

It is noted that the above descriptions of the process 2000 are only for demonstration purposes, and not intended to be limiting. It is understandable that, after learning the major concept of the present invention, a person of ordinary skills in the art may alter the process 2000 in an uncreative manner. For example, the operations above may be implemented in an order different from that illustrated in FIG. 20. One or more optional operations may be added to the flowcharts. One or more operations may be split or be combined. All such modifications are within the scope of the present invention.

In some embodiments, after S6, the following operations may be performed for further filtering the filtered results obtained via the step S5. The acquisition unit may obtain a third natural language sentence (similar to the step S1 or an embodiment thereof). The pre-processing unit 2 may generate a second standard node sequence at least in part on the third natural language sentence (similar to the step S2 or an embodiment thereof). The node tree construction unit 3 may construct a second node tree based on the second standard node sequence (similar to the step S3 or an embodiment thereof). Then the filtered result obtained via the step S5 may be further filtered based on the second node tree to obtain a second filtered result (similar to the filtering the query results as in the step S5).

In some embodiments, the third natural language sentence may lack some information that has already been included in the first natural language sentence. For example, the first natural language sentence may be "show me the students whose score is above 80 in the last math examination", and have a corresponding standard node sequence "Target|Students|Math Score|>80|TIME|20180105." The third natural language sentence may be "show me the ones over 90". Solely based on the third natural language sentence, only a number node ">90" may be obtained, which is insufficient for constructing a node tree.

To solve the above problem, the pre-processing unit 2 may first construct a preliminary standard node sequence based on the third natural language. For example, in the above cases, the preliminary standard node sequence may be ">90".

Then the pre-processing unit 2 may identify one or more missing nodes of the preliminary standard node sequence. The pre-processing unit 2 may use one or more template for identifying the missing nodes. The pre-processing unit 2 may determine the template to be used based on the type and number of nodes in the preliminary standard node sequence. In some embodiments, the pre-processing unit 2 may determine the template to be used based further on a previously determined standard node sequence. A template corresponding to a previous standard node sequence may have a great chance to fit for the preliminary standard node sequence.

For example, in the above case, a template used for identifying the one or more missing nodes may be "Target|target node|First index node|Number node|Time|time node|", and a target node, an index node, and a time node is identified as missing from the preliminary standard node sequence.

The pre-processing unit 2 may identify target nodes of the first standard node sequence corresponding to the one or more missing nodes of the second standard node sequence and then generate the second standard node sequence based on the target nodes of the first standard node sequence and the preliminary standard node sequence. For example, in the above case, the pre-processing unit 2 may search for a target node, an index node, and a time node in the first standard node sequence "Target|Students|Math Score|>80|TIME|20180105," and find a target node "students", an index node "Math Score", and a time node "20180105".

The pre-processing unit 2 may then use the found target nodes and the preliminary standard node sequence to generate the second standard node sequence. For example, the pre-processing unit 2 may use nodes of the preliminary standard node sequence and the found nodes to fill the blanks of the corresponding template, and the second standard node sequence may be generated as a result.

In some embodiments, the query selection system may further provide means for performing a desired operation on one or more items of the filtered result. For example, the query selection system may obtain a fourth natural language sentence input by a user and generate a fourth standard node sequence based on the fourth natural language sentence (e.g., via the operations S1 and S2). The fourth standard node sequence may include an operation node and one or more object nodes. The operation node may correspond to a desired operation to be performed, and the one or more object nodes may indicate one or more items of the filtered result upon which the desired operation is to be performed. The query selection system may generate an operation command according to the operation node and the one or more object nodes, and cause, according to the operation command, the desired operation to be performed on the one or more items of the first filtered result.

The desired operation may be according to the application scenario of the querying selection system. For example, a filtered result obtained according to a natural language sentence "show me the stocks with the net profit increasing at over 50% for last three years" may include a stock A and a stock B. The user may input a fourth natural language sentence such as "buy 1,000 shares of the stock A". A fourth standard node sequence "Buy|1,000 shares|Stock A" may be generated accordingly, wherein the node "Buy" is the operation node, and the node "Stock A" is the object node. The node "1,000 shares" may be a parameter node specifying how to perform the operation. The corresponding operation command may cause the querying selection system to buy 1,000 shares of the stock A.

In some embodiments, the user may not precisely give the correct name or full name of the object of the operation. For example, in the above case, the user may just input "buy 1,000 shares of the A". Correspondingly, the raw node sequence may be "Buy|1,000 shares|A". And the object node may be determined as "A", which is not a valid object node. To obtain the correct node "Stock A", the querying selection system may search the displayed data to find a corresponding node most similar to the node "A". The similarity may be determined based on various metrics. When the node "Stock A" is found as the node most similar to the node "A". The querying selection system may designate the node "Stock A" as the object node. Optionally, the system may display the designated object node to double check with the user.

The embodiments in this disclosure are described progressively. That is, each embodiment describes the parts that are different from other embodiments, and the same or similar parts may be applicable among various embodiments.

The steps of methods or algorithm described in the disclosed embodiments may be implemented by hardware, software blocks executed by processors, or any combination thereof. The software blocks may be placed in random access memory (RAM), read-only memory (ROM), electrically programmable ROM, electrically erasable programmable ROM, register, hard disk, removable disk, CD-ROM or any other types of storage medium known in the technical field.

This description is intended to be illustrative for those skilled in the art to realize and implement present invention. Thus, many alternatives, modifications, and variations will be apparent to those skilled in the art. The features, structures, methods, and other characteristics of the exemplary embodiments described herein may be realized in other embodiments without departing from the spirit and scope of the present invention. Therefore, the present invention is not limited to the embodiments described above but the broadest range which is consistent with the disclosed method and the inventive characteristics in present invention.

What is claimed is:

1. A query selection method for data query, implemented on a hardware which has at least one processor and at least one storage device, comprising:
    obtaining, by the at least one processor, a natural sentence;
    generating, by the at least one processor, a preliminary standard node sequence based on the natural sentence, the preliminary standard node sequence including multiple index nodes and at least one condition node, the at least one condition node including at least one of a number node, a date node, or a character string node;
    generating, by the at least one processor, a standard node sequence by updating the preliminary standard node sequence; and
    generating, by the at least one processor, a data query command for the data query based on the standard node sequence and a relationship between one of the multiple index nodes and one of the at least one condition node.

2. The method of claim 1, wherein the obtaining, by the at least one processor, a natural sentence includes:
    receiving, by the at least one processor, audio information inputted by a user via a voice input device; and
    obtaining, by the at least one processor, the natural sentence by performing a speech recognition on the audio information.

3. The method of claim 2, wherein the speech recognition is performed based on at least one of a user status of the user or historical activity information of the user.

4. The method of claim 1, wherein the generating, by the at least one processor, a preliminary standard node sequence based on the natural sentence includes:
    obtaining, by the at least one processor, multiple words or phrases by performing word segmentation on the natural sentence;
    obtaining, by the at least one processor, a raw node sequence corresponding to the natural sentence, the raw node sequence including at least one node, each node of the at least one node in the raw node sequence including a word or a phrase of the multiple words or phrases;
    determining, by the at least one processor, that the raw node sequence is non-standard by examining index key words or matching characteristics of specific phrasing; and
    converting, by the at least one processor, the non-standard raw node sequence to the preliminary standard node sequence.

5. The method of claim 1, wherein the generating, by the at least one processor, a standard node sequence by updating the preliminary standard node sequence includes:
- identifying, by the at least one processor, a first update node included in the preliminary standard node sequence, the first update node indicating an update of the preliminary standard node sequence to be performed;
- identifying, by the at least one processor, an index/condition node to be updated in the preliminary standard node according to nodes within a first distance from the first update node;
- identifying, by the at least one processor, a second update node within a second distance from the first update node, the second update node indicating how to update the index/condition node to be updated;
- updating, by the at least one processor, the index/condition node to be updated according to the second update node; and
- generating, by the at least one processor, the standard node sequence by removing at least the first update node and the second update node from the preliminary standard node.

6. The method of claim 5, wherein the second distance is the same as or different from the first distance.

7. The method of claim 1, wherein the generating, by the at least one processor, a standard node sequence by updating the preliminary standard node sequence includes:
- identifying, by the at least one processor, one or more missing nodes of the preliminary standard node sequence;
- identifying, by the at least one processor, target nodes of a previously determined standard node sequence corresponding to the one or more missing nodes of the preliminary standard node sequence; and
- generating, by the at least one processor, the standard node sequence by updating, based on the target nodes of the previously determined standard node sequence, the preliminary standard node sequence.

8. The method of claim 1, wherein the generating, by the at least one processor, a data query command for the data query based on the standard node sequence and a relationship between one of the multiple index nodes and one of the at least one index node includes:
- constructing a node tree according to the standard node sequence, the relationship between one of the multiple index nodes and one of the at least one index node; and
- generating the data query command according to the node tree.

9. The method of claim 8, further comprising:
- obtaining, by the at least one processor, a query result by querying data using the data query command from one or more databases, wherein the multiple index nodes correspond to indexes of the one or more database;
- obtaining, by the at least one processor, a filtered result by filtering the query result based on the node tree; and
- causing, by the at least one processor, an interface to display the filtered result.

10. The method of claim 9, wherein the causing, by the at least one processor, an interface to display the filtered result includes:
- identifying, by the at least one processor, a first index corresponding to an index node of the standard node sequence; and
- causing, by the at least one processor, the interface to display first data of items of the filtered result corresponding to the first index.

11. The method of claim 10, wherein the causing, by the at least one processor, an interface to display the filtered result further comprises:
- selecting, by the at least one processor, one or more second indexes from the indexes of the one or more databases based on correlation indicators of the indexes of the one or more databases with respect to the first index, wherein each of the correlation indicators indicates a correlation between a corresponding index of the indexes of the one or more databases and the first index; and
- causing, by the at least one processor, the interface to display second data of items of the filtered result corresponding to the one or more second indexes, wherein the standard node sequence includes no node corresponding to the one or more second indexes.

12. The method of claim 10, wherein the causing, by the at least one processor, an interface to display the filtered result further comprises:
- causing, by the at least one processor, the interface to display third data of items of the filtered result corresponding to a third index in response to an operation of a user; and
- updating, by the at least one processor, a correlation indicator of the third index.

13. A query selection system for data query, comprising:
at least one storage device including a set of instructions; and
at least one processor in communication with the at least one storage medium, wherein when executing the set of instructions, the at least one processor is configured to cause the system to perform operations including:
obtaining, by the at least one processor, a natural sentence;
generating, by the at least one processor, a preliminary standard node sequence based on the natural sentence, the preliminary standard node sequence including multiple index nodes and at least one condition node, the at least one condition node including at least one of a number node, a date node, or a character string node;
generating, by the at least one processor, a standard node sequence by updating the preliminary standard node sequence; and
generating, by the at least one processor, a data query command for the data query based on the standard node sequence and a relationship between one of the multiple index nodes and one of the at least one condition node.

14. The method system of claim 13, wherein the generating, by the at least one processor, a preliminary standard node sequence based on the natural sentence includes:
- obtaining, by the at least one processor, multiple words or phrases by performing word segmentation on the natural sentence;
- obtaining, by the at least one processor, a raw node sequence corresponding to the natural sentence, the raw node sequence including at least one node, each node of the at least one node in the raw node sequence including a word or a phrase of the multiple words or phrases;
- determining, by the at least one processor, that the raw node sequence is non-standard by examining index key words or matching characteristics of specific phrasing; and
- converting, by the at least one processor, the non-standard raw node sequence to the preliminary standard node sequence.

15. The system of claim 13, wherein the generating, by the at least one processor, a standard node sequence by updating the preliminary standard node sequence includes:
- identifying, by the at least one processor, a first update node included in the preliminary standard node sequence, the first update node indicating an update of the preliminary standard node sequence to be performed;
- identifying, by the at least one processor, an index/condition node to be updated in the preliminary standard node according to nodes within a first distance from the first update node;
- identifying, by the at least one processor, a second update node within a second distance from the first update node, the second update node indicating how to update the index/condition node to be updated;
- updating, by the at least one processor, the index/condition node to be updated according to the second update node; and
- generating, by the at least one processor, the standard node sequence by removing at least the first update node and the second update node from the preliminary standard node.

16. The system of claim 15, wherein the second distance is the same as or different from the first distance.

17. The system of claim 13, wherein the generating, by the at least one processor, a standard node sequence by updating the preliminary standard node sequence includes:
- identifying, by the at least one processor, one or more missing nodes of the preliminary standard node sequence;
- identifying, by the at least one processor, target nodes of a previously determined standard node sequence corresponding to the one or more missing nodes of the preliminary standard node sequence; and
- generating, by the at least one processor, the standard node sequence by updating, based on the target nodes of the previously determined standard node sequence, the preliminary standard node sequence.

18. The system of claim 13, wherein the generating, by the at least one processor, a data query command for the data query based on the standard node sequence and a relationship between one of the multiple index nodes and one of the at least one index node includes:
- constructing a node tree according to the standard node sequence, the relationship between one of the multiple index nodes and one of the at least one index node; and
- generating the data query command according to the node tree.

19. The system of claim 18, further comprising:
- obtaining, by the at least one processor, a query result by querying data using the data query command from one or more databases, wherein the multiple index nodes correspond to indexes of the one or more database;
- obtaining, by the at least one processor, a filtered result by filtering the query result based on the node tree; and
- causing, by the at least one processor, an interface to display the filtered result.

20. A non-transitory computer readable medium, comprising at least one set of instructions for data processing, wherein when executed by one or more processors of a computing device, the at least one set of instructions causes the computing device to perform a method, the method comprising:
- obtaining, by the at least one processor, a natural sentence;
- generating, by the at least one processor, a preliminary standard node sequence based on the natural sentence, the preliminary standard node sequence including multiple index nodes and at least one condition node, the at least one condition node including at least one of a number node, a date node, or a character string node;
- generating, by the at least one processor, a standard node sequence by updating the preliminary standard node sequence; and
- generating, by the at least one processor, a data query command for the data query based on the standard node sequence and a relationship between one of the multiple index nodes and one of the at least one condition node.

* * * * *